United States Patent
Yoshizawa et al.

(10) Patent No.: US 8,369,359 B2
(45) Date of Patent: Feb. 5, 2013

(54) COMMUNICATION DEVICE, COMMUNICATION METHOD, AND INTEGRATED CIRCUIT

(75) Inventors: Kensuke Yoshizawa, Fukuoka (JP); Taisuke Konishi, Fukuoka (JP); Atsushi Narita, Fukuoka (JP); Takayoshi Koyama, Kyoto (JP)

(73) Assignee: Panasonic Corporation, Osaka (JP)

( * ) Notice: Subject to any disclaimer, the term of this patent is extended or adjusted under 35 U.S.C. 154(b) by 481 days.

(21) Appl. No.: 12/688,868

(22) Filed: Jan. 16, 2010

(65) Prior Publication Data

US 2010/0183029 A1    Jul. 22, 2010

(30) Foreign Application Priority Data

Jan. 16, 2009  (JP) ................................ 2009-007906
Jan. 16, 2009  (JP) ................................ 2009-007907

(51) Int. Cl.
    *H04J 3/16*    (2006.01)
(52) U.S. Cl. ........................ 370/470; 375/296
(58) Field of Classification Search ................. 370/470; 340/310.11, 538, 538.11
    See application file for complete search history.

(56) References Cited

U.S. PATENT DOCUMENTS

| 6,404,822 | B1* | 6/2002 | Ben-Michael et al. | ....... 375/296 |
| 7,167,449 | B2* | 1/2007 | Ikeda et al. | ................... 370/235 |
| 2002/0051466 | A1 | 5/2002 | Bruckman | |
| 2005/0169363 | A1* | 8/2005 | Logvinov et al. | ............. 375/240 |
| 2006/0250223 | A1* | 11/2006 | Koga et al. | ............... 340/310.11 |

FOREIGN PATENT DOCUMENTS

| CN | 101286971 | 10/2008 |
| JP | 59-143435 | 8/1984 |
| JP | 61-194926 | 8/1986 |
| JP | 2004-23311 | 1/2004 |
| JP | 2006-246035 | 9/2006 |
| JP | 2007-166104 | 6/2007 |

OTHER PUBLICATIONS

International Search Report dated Jul. 16, 2010.

* cited by examiner

*Primary Examiner* — Mark Rinehart
*Assistant Examiner* — Matthew Hopkins
(74) *Attorney, Agent, or Firm* — Dickinson Wright PLLC

(57) ABSTRACT

A communication device for transmitting data to an other communication device via a transmission channel, includes a communication characteristic acquisition section which acquires a communication characteristic of the transmission channel, and a frame length control section which controls a frame length of a communication frame storing the data based on the communication characteristic of the transmission channel.

17 Claims, 24 Drawing Sheets

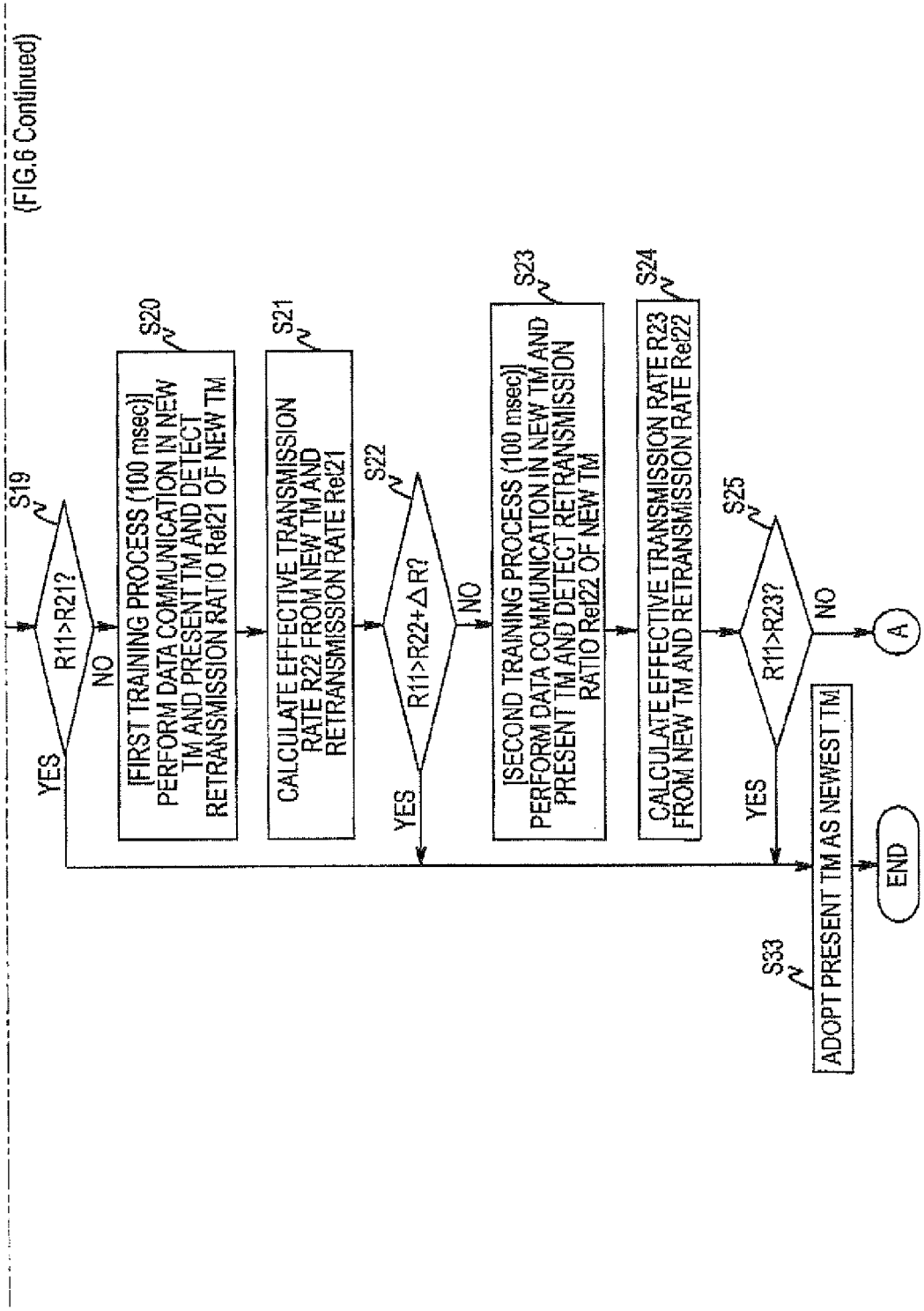

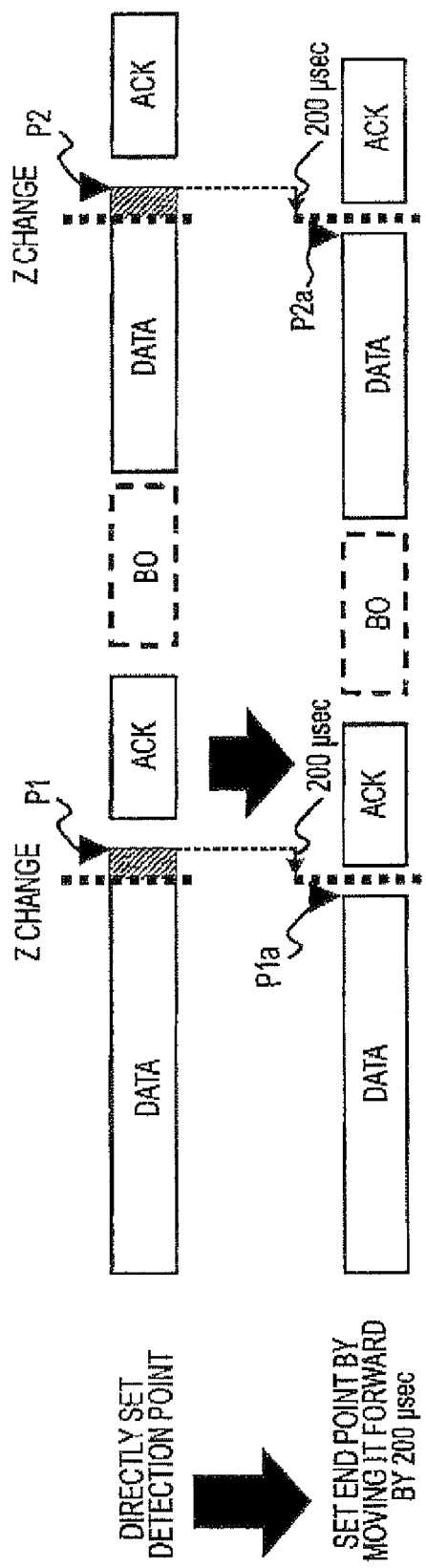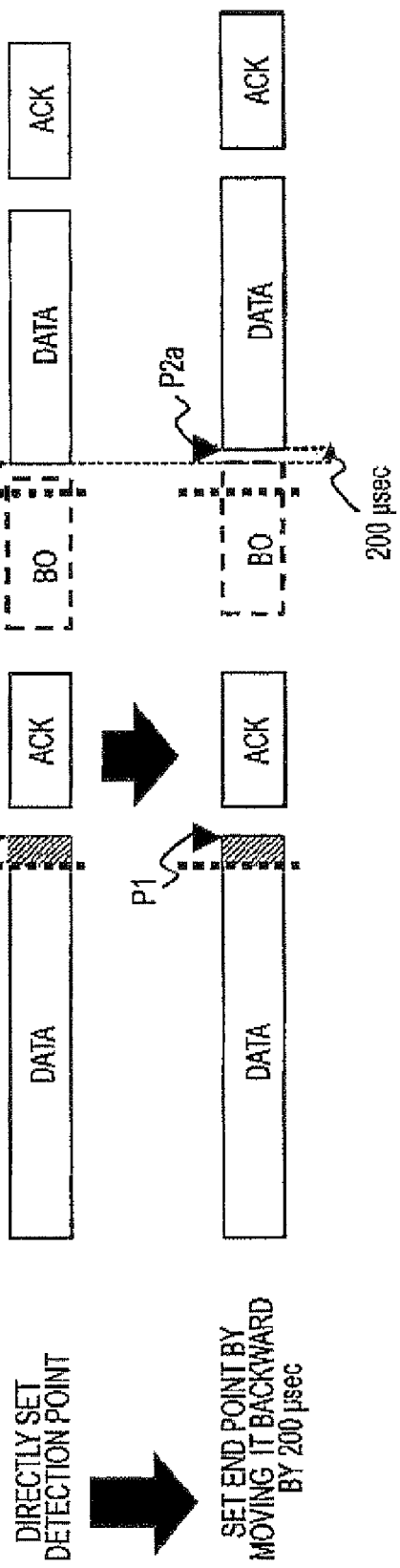

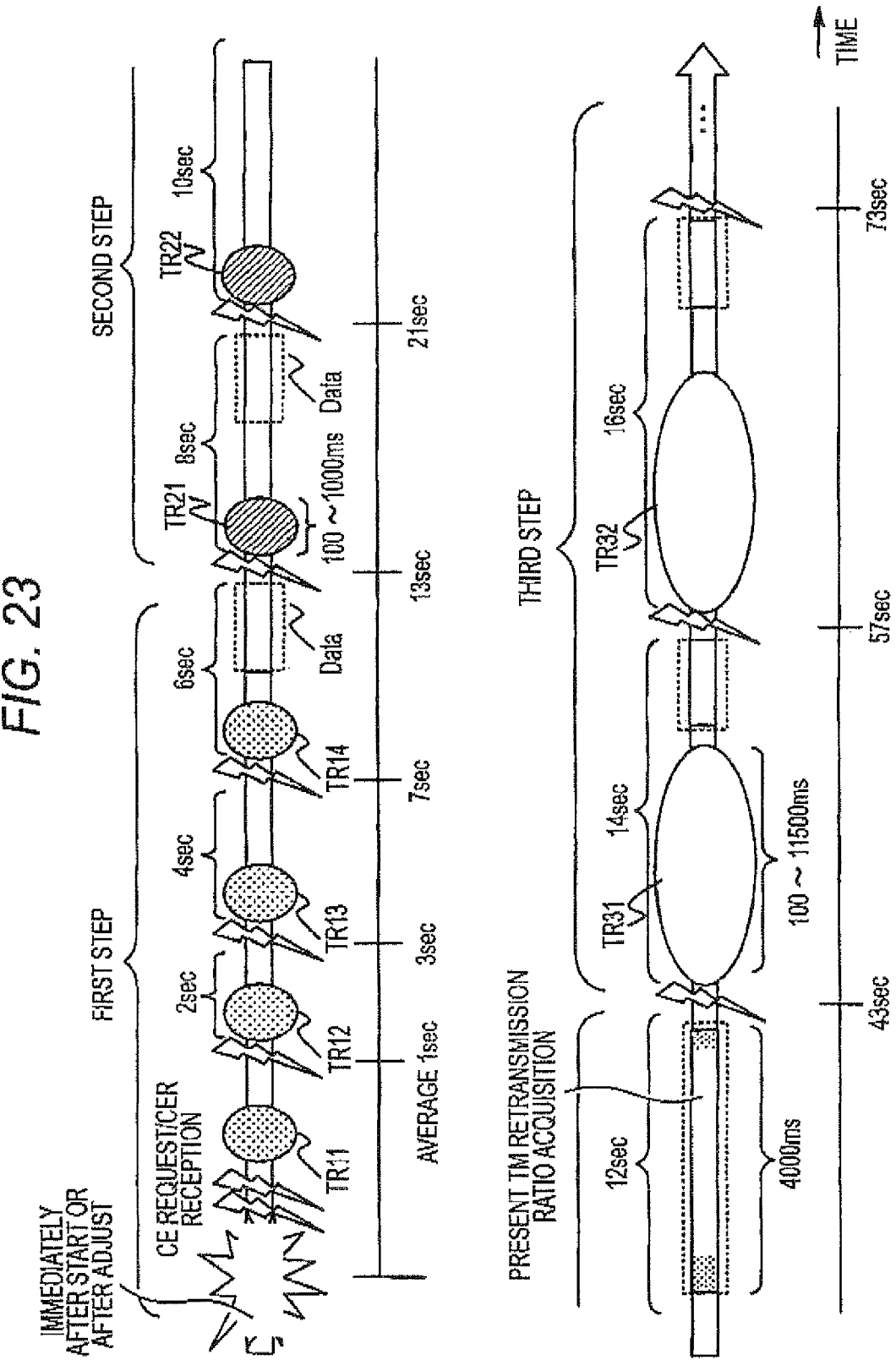

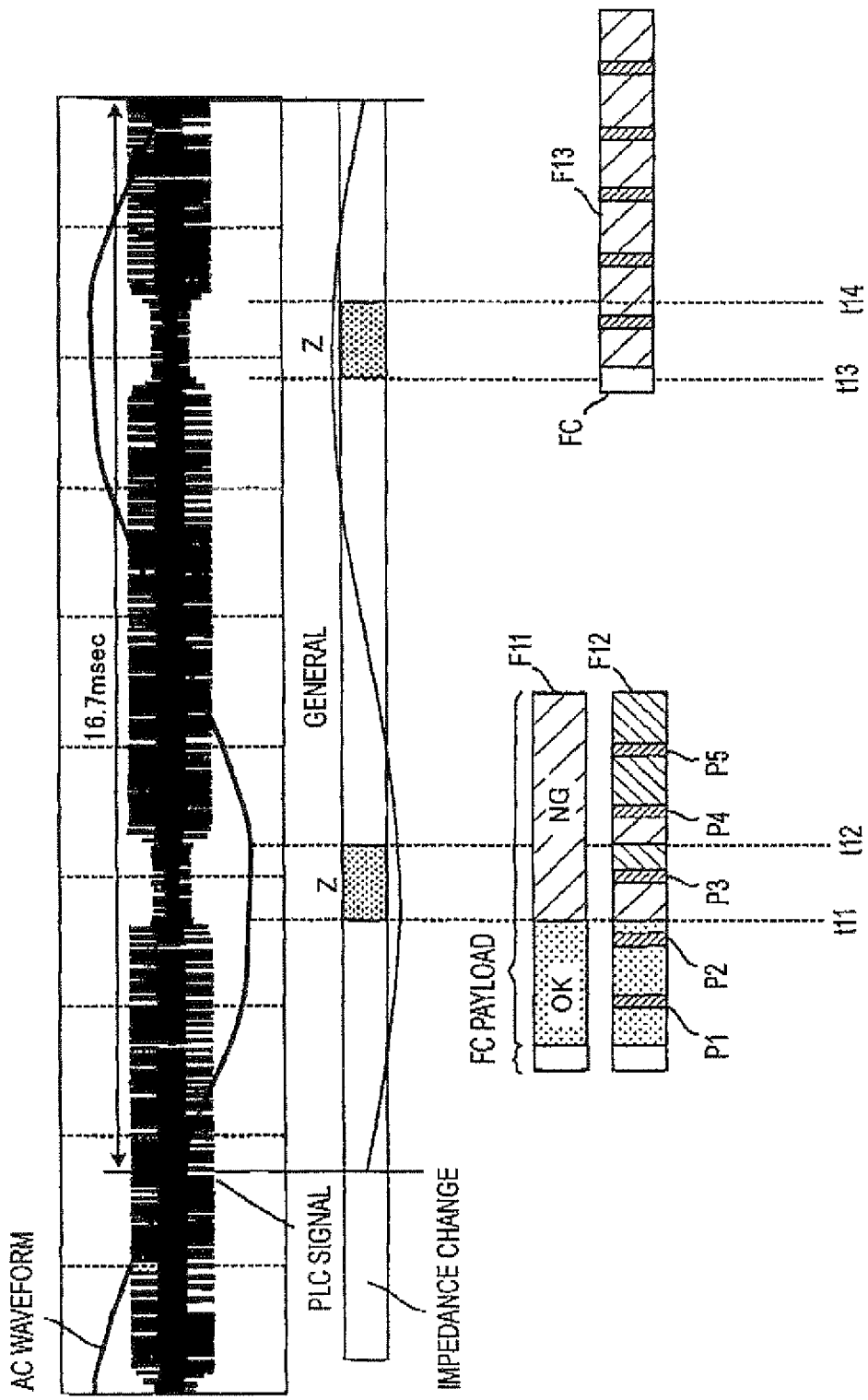

COMMUNICATION DEVICE, COMMUNICATION METHOD, AND INTEGRATED CIRCUIT

BACKGROUND

The present invention relates to a communication device which determines communication parameters depending on the situation and performs communication via a predetermined transmission channel using the determined communication parameters.

Upon communication between a plurality of communication devices, one communication device is able to generate a fixed or variable length communication frame, store some or all of data as an object to be transmitted in a payload of the communication frame, and transmit sequential data to a transmission channel on a communication frame basis.

The characteristics of the transmission channel via which the data is transmitted are inconstant and sequentially changed with environmental variation or the lapse of time. Various types of noise appear since various types of electric equipment are connected to a power line when the transmission channel is the power line. Impedance is changed with an alternating-current power waveform (AC waveform) and the characteristics of the transmission channel are changed.

Specifically, when a power line communication device which performs communication using a power line transmits a power line communication signal (hereinafter, also referred to as a PLC signal) to the power line as shown in the example of FIG. 24, the amplitude or waveform of the PLC signal is changed in response to the characteristics of the power line. This change is usually generated with the change of impedance (Z) (hereinafter, also referred to as the Z change) related to the power line. Usually, the Z change is periodically generated in synchronization with an alternating-current power waveform (AC waveform) as shown in FIG. 24.

In the example shown in FIG. 24, the impedance is changed at each of times t11, t12, t13, and t14 in the binary form. The Z change timing is generated in the vicinity of peaks and troughs of the alternating-current power waveform.

In FIG. 24, a PLC signal frame F11 is affected by the Z change since the Z change appears on a power line 700 from a time before time t11 to a time after time t12. Communication parameters of a frame subsequent to an FC (frame control section: corresponding to a header) are controlled in response to the impedance of an FC transmission period. Therefore, a transmission error does not occur since data packets appearing up to time t11 among a plurality of data packets included in a payload of the frame F11 have the same impedance as the FC, but data packets after time t11 all become error packets since the data packets after time t11 have the impedance different from the FC.

A frame F12 is also affected by the Z change. In this regard, pilot symbols (pilot signals) P1, P2, P3, P4, and P5 as known information are included in the middle of the frame F12. The influence of the Z change is less in the frame F12 than in the frame F11 since communication parameters of a signal subsequent to a pilot signal are controlled in response to the impedance of a transmission period of the pilot signal. However, data packets over the commencement (for example, t11) of the Z change or the termination (for example, t12) become error packets even in the frame F12 into which pilot symbols have been inserted.

A frame F13 is also affected by the Z change. Since communication parameters of a frame subsequent to an FC (frame control section: corresponding to a header) are controlled in response to the impedance of an FC transmission period, the communication parameters all become error parameters when the FC transmission period is over the commencement (for example, t11) of the Z change or the termination (for example, t12).

As a technique for reducing the influence of noise associated with an alternating-current power waveform, it is known that a zero-crossing point of the alternating-current power waveform is detected and data is transmitted in a sufficiently shorter period than a power supply cycle in the vicinity of the zero-crossing point.

Patent Literature

PTL 1 JP-A-59-143435

SUMMARY

However, it may be inevitable that the efficiency of transmission is reduced when a frame length of a communication frame to be transmitted is limited to be merely sufficiently short.

An object of the present invention is to provide a communication device that can maintain optimal communication characteristics and also can prevent the efficiency of transmission from being degraded even when the state of a transmission channel is not constant, a communication method and an integrated circuit provided in the communication device.

According to the present invention, there is provided a communication device for transmitting data to an other communication device via a transmission channel, comprising: a communication characteristic acquisition section which acquires a communication characteristic of the transmission channel; and a frame length control section which controls a frame length of a communication frame storing the data based on the communication characteristic of the transmission channel.

According to the present invention, there is also provided a communication method for transmitting data to an other communication device via a transmission channel, comprising: generating a communication frame storing the data; acquiring a communication characteristic of the transmission channel; and controlling a frame length of the communication frame based on the communication characteristic of the transmission channel.

According to the present invention, there is also provided an integrated circuit use in a communication device for transmitting data to an other communication device via a transmission channel, comprising: a communication frame generation section which generates a communication frame storing the data; a communication characteristic acquisition section which acquires a communication characteristic of the transmission channel; and a frame length control section which controls a frame length of the communication frame based on the communication characteristic of the transmission channel.

The present invention can maintain optimal communication characteristics and also prevent the efficiency of transmission from being degraded even when the state of a transmission channel is not constant by determining whether or not the frame length is to be controlled on the basis of communication performance of the communication frame.

BRIEF DESCRIPTION OF THE DRAWINGS

FIGS. 16A and 16B are diagrams showing an example of correcting an FL control change point according to the second embodiment of the present invention.

FIG. 23 is a diagram showing the flow of the case of changing a training method step-by-step according to the third embodiment of the present invention.

FIG. 24 is a diagram showing the amplitude and waveform of a PLC signal changing in response to characteristics of a power line of related art.

DETAILED DESCRIPTION OF EXEMPLARY EMBODIMENTS

Hereinafter, a communication device of an embodiment of the present invention will be described using the drawings.

Figure 1:
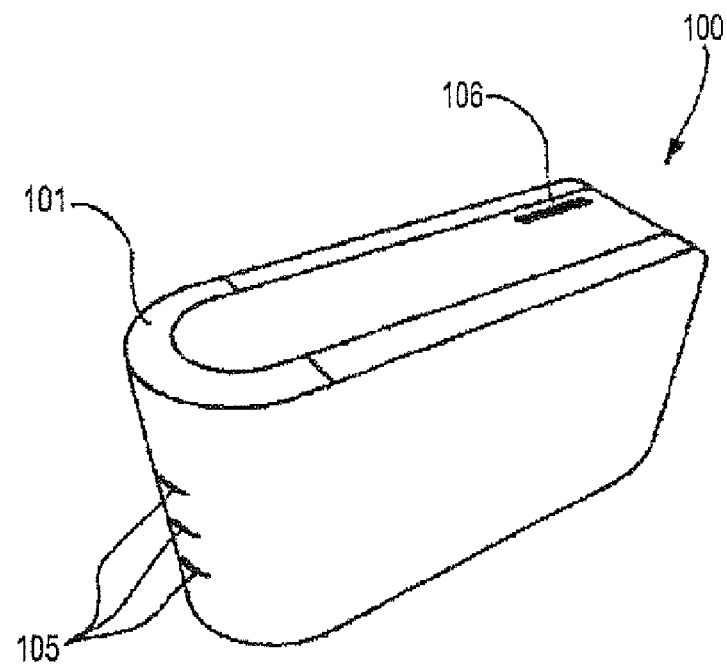
FIG. 1 is an external perspective view showing the front side of a PLC modem according to an embodiment of the present invention.
Figure 2:
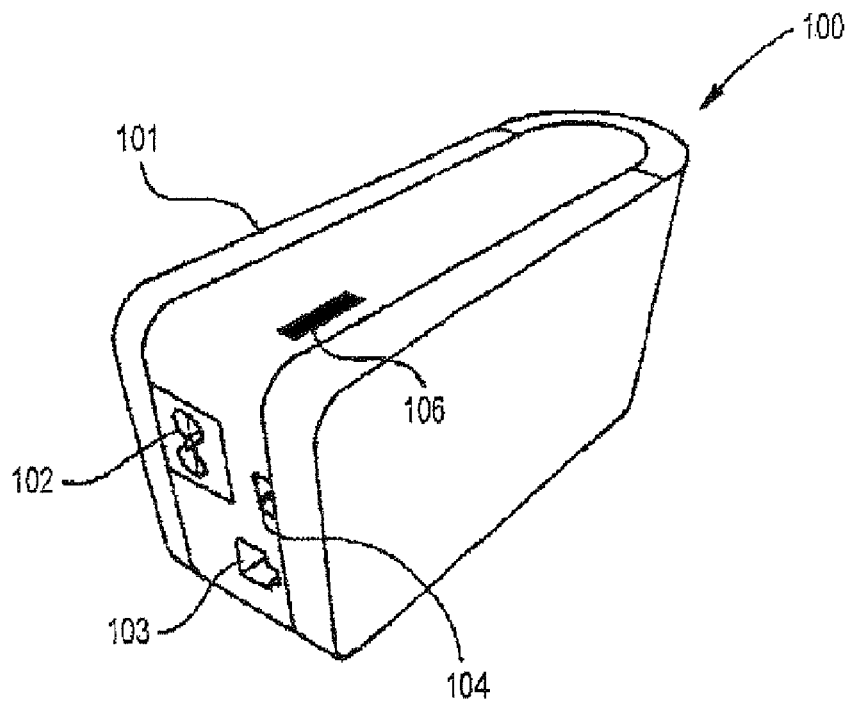
FIG. 2 is an external perspective view showing the backside of the PLC modem according to an embodiment of the present invention.

FIG. 1 is an external perspective view showing the front side of a PLC (Power Line Communication) modem 100 as an example of a power line communication device. FIG. 2 is an external perspective view showing the backside of the PLC modem 100. The PLC modem 100 shown in FIGS. 1 and 2 has a housing 101. An indication section 105 of LEDs (Light Emitting Diodes) or the like shown in FIG. 1 is mounted on the front side of the housing 101.

As shown in FIG. 2, a power connector 102, a LAN (Local Area Network) modular jack 103 such as RJ45 or the like, and a changeover switch 104 which switches an operating mode (master device mode/slave device mode) are mounted on the backside of the housing 101.

A button 106 is mounted on the top of the housing. The button 106 has a function as a setup button to start a process (registration process) for enabling the PLC modem 100 to perform communication. Furthermore, the button 106 has been mounted on the top of the housing 101 as illustration, but is not limited to a position thereof.

A power cable (not shown) is connected to the power connector 102, and a LAN cable (not shown) is connected to the modular jack 103. Furthermore, a Dsub (D-subminiature) connector may be mounted on the PLC modem 100 and a Dsub cable may be connected to the PLC modem 100.

The PLC modem 100 has been shown as an example of the power line communication device, but electric equipment having a built-in PLC modem may serve as the power line communication device. For example, a home appliance such as a television, a telephone, a video cassette recorder, a set-top box, or the like, or business equipment such as a personal computer, a facsimile, a printer, or the like may serve as electric equipment.

The PLC modem 100 connected to a power line 700 constitutes a power line communication system with another PLC modem 100.

Figure 3:
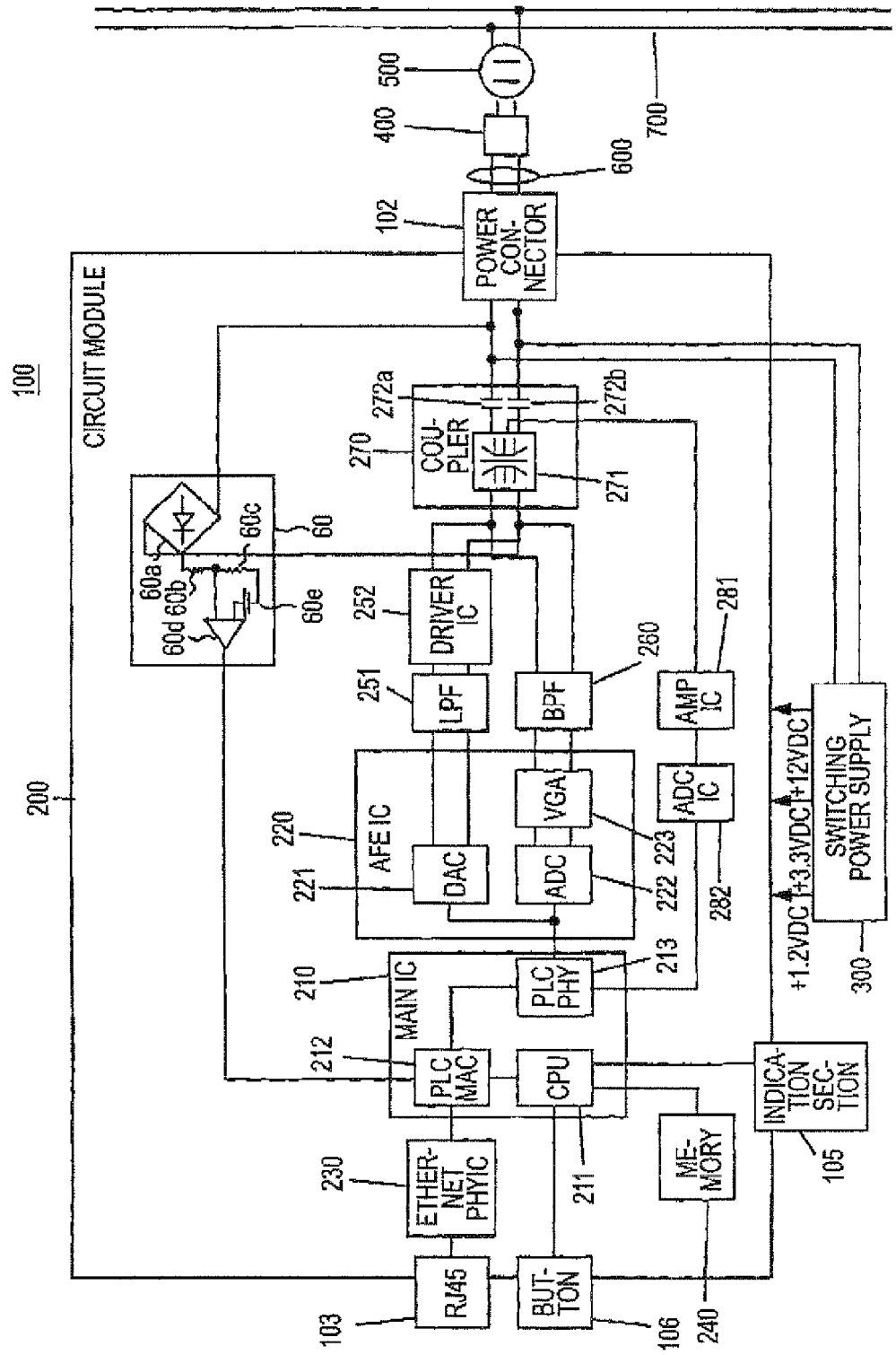
FIG. 3 is a diagram showing an example of hardware of the PLC modem according to an embodiment of the present invention.

Next, FIG. 3 mainly shows an example of a hardware configuration of the PLC modem 100. The PLC modem 100 has a circuit module 200 and a switching power supply 300. The switching power supply 300 supplies the circuit module 200 with various voltages (for example, +1.2V, +3.3V, and +12). For example, the switching power supply 300 includes a switching transformer and a DC-DC converter (both of which are not shown).

A main IC (Integrated Circuit) 210, an AFE IC (Analog Front End Integrated Circuit) 220, an Ethernet (registered trademark) PHY IC (Physical layer Integrated Circuit) 230, a memory 240, a low-pass filter (LPF) 251, a driver IC 252, a bandpass filter (BPF) 260, a coupler 270, an AMP (amplifier) IC 281, an ADC (AD conversion) IC 282, and an AC cycle detector 60 are mounted on the circuit module 200. The switching power supply 300 and the coupler 270 are connected to the power connector 102, and are further connected to the power line 700 via the power cable 600, a power plug 400, and an electric outlet 500. The main IC 210 functions as a control circuit which performs power line communication.

The main IC 210 includes a CPU (Central Processing Unit) 211, a PLC MAC (Power Line Communication Media Access Control layer) block 212, and a PLC PHY (Power Line Communication Physical layer) block 213.

The CPU 211 is equipped with a 32-bit RISC (Reduced Instruction Set Computer) processor. The PLC MAC block 212 manages a MAC (Media Access Control) layer for transmission and reception signals. The PLC PRY block 213 manages a PHY (Physical layer) for transmission and reception signals.

The AFE IC 220 includes a DA converter (DAC: D/A converter) 221, an AD converter (ADC: A/D converter) 222, and a variable amplifier (VGA: Variable Gain Amplifier) 223. The coupler 270 includes a coil transformer 271 and coupling capacitors 272a and 272b.

The CPU 211 controls the operations of the PLC MAC block 212 and the PLC PHY block 213 using data stored in the memory 240, and also controls the entirety of the PLC modem 100.

Communication by the PLC modem 100 is schematically performed as follows. Data input from the modular jack 103 is sent to the main IC 210 via the Ethernet (registered trademark) PHY IC 230 and is applied to a digital signal process to generate a digital transmission signal. The generated digital transmission signal is converted into an analog signal by the DA converter (DAC) 221 of the AFE IC 220. The analog signal is output to the power line 700 via the low-pass filter 251, the driver IC 252, the coupler 270, the power connector 102, the power cable 600, the power plug 400, and the electric outlet 500.

The analog signal received from the power line 700 is transmitted to the bandpass filter 260 via the coupler 270. After the variable gain amplifier (VGA) 223 of the APE IC 220 performs a gain adjusting process for the analog signal, the analog signal is converted into a digital signal by the AD converter (ADC) 222. The digital signal into which the analog signal has been converted is transmitted to the main IC 210 and is converted into digital data by the digital signal process. The digital data into which the digital signal has been converted is output from the modular jack 103 via the Ethernet (registered trademark) PHY IC 230.

The AC cycle detector 60 mounted on the circuit module 200 generates a sync signal necessary for executing a control process at the common timing in a plurality of PLC modems 100 which mutually perform communication. That is, the AC cycle detector 60 generates a signal synchronized with an alternating-current power waveform supplied to the power line 700.

The AC cycle detector 60 includes a diode bridge 60a, resistors 60b and 60c, a direct-current power supply section 60e, and a capacitor 60d. An output of the diode bridge 60a is connected to the resistor 60b. The resistor 60b is connected in series to the resistor 60c. The resistors 60b and 60c are connected in parallel to one terminal of the capacitor 60d. The direct-current power supply section 60e is connected to the other terminal of the capacitor 60d.

Specifically, the AC cycle detector 60 operates as follows. That is, the AC cycle detector 60 detects a zero-crossing point of a commercial alternating-current power waveform AC supplied to the power line 700, that is, an alternating-current waveform including a sinusoidal wave of 50 Hz or 60 Hz, and generates a sync signal on the basis of the timing at the time. A rectangular wave formed by a plurality of pulses synchronized with zero-crossing points of the alternating-current power waveform is used as a specific example of the sync signal. Since this signal is used to determine a phase of an alternating-current power waveform to be described later, it is possible to use the signal as a substitute for a circuit which detects an arbitrary voltage of an alternating-current power supply.

Next, an example of a digital signal process to be implemented by the main IC 210 will be described. The PLC modem 100 uses a multicarrier signal, such as an OFDM (Orthogonal Frequency Division Multiplexing) signal generated using a plurality of sub-carriers, as a transmission signal. The PLC modem 100 converts data as an object to be transmitted into a multicarrier transmission signal such as an OFDM transmission signal and outputs the multicarrier transmission signal. Also, the PLC modem 100 converts a multicarrier reception signal such as an OFDM signal into reception data by processing the multicarrier reception signal. The digital signal process for conversion is mainly performed by the PLC PHY block 213.

Figure 4:
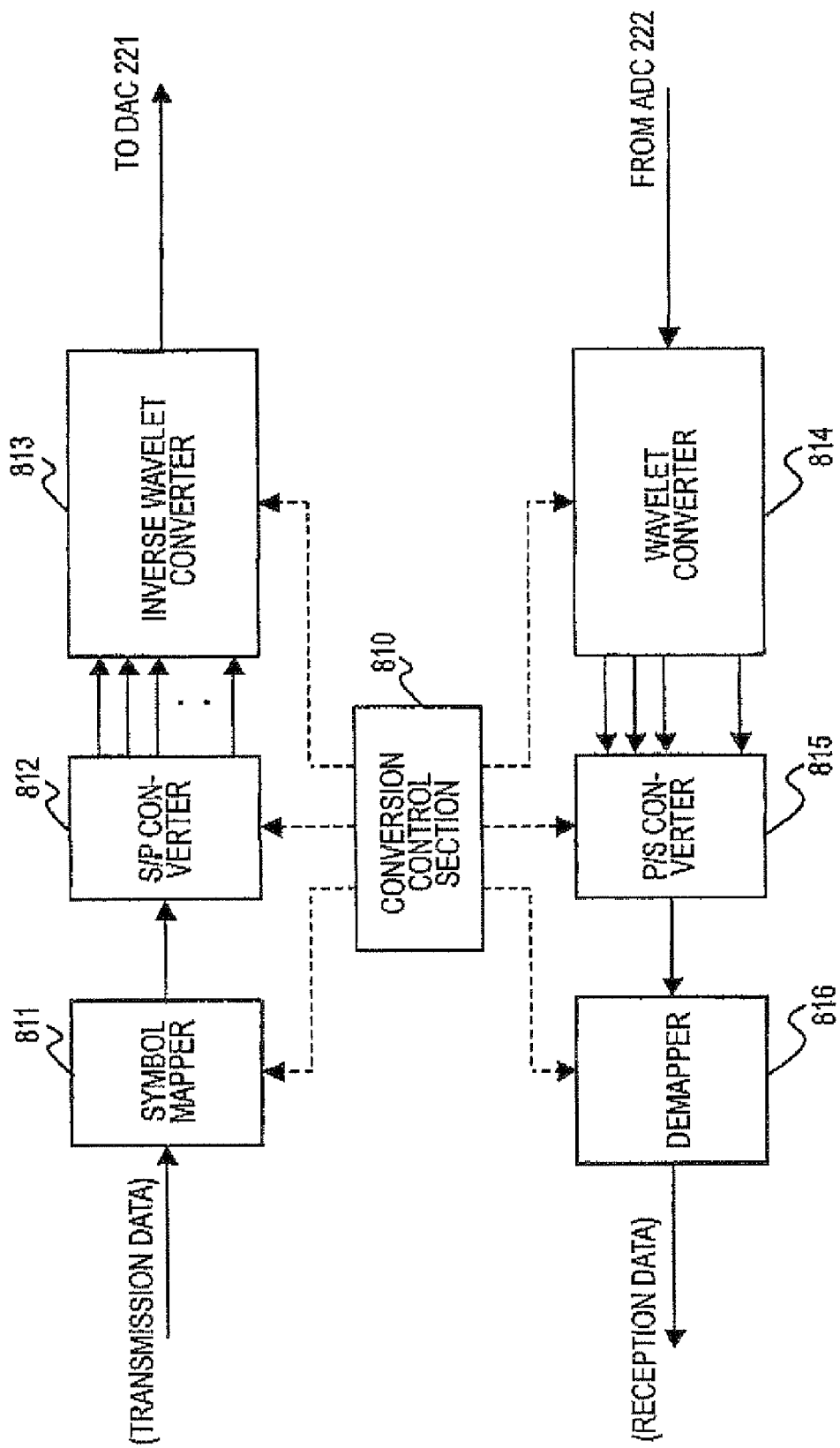
FIG. 4 is a diagram illustrating a digital signal process of the PLC modem according to an embodiment of the present invention.

An example of a functional configuration necessary for performing the digital signal process to be implemented by the PLC PHY block 213 is shown in FIG. 4. In the example shown in FIG. 4, a configuration in which OFDM transmission is performed using wavelet conversion is shown. As shown in FIG. 4, the PLC PHY block 213 has the functions of a conversion control section 810, a symbol mapper 811, a serial-parallel (S/P) converter 812, an inverse wavelet transformer 813, a wavelet transformer 814, a parallel-serial (P/S) converter 815, and a demapper 816.

The symbol mapper 811 converts bit data to be transmitted into symbol data, and performs symbol mapping (for example, PAM (Pulse Amplitude Modulation) modulation) according to the symbol data. The serial-parallel converter 812 receives mapped serial data, converts the received data into parallel data, and outputs the parallel data. The inverse wavelet transformer 813 performs an inverse wavelet process for the parallel data and generates a sample value system representing a transmission symbol as data on a time axis. The data is sent to the DA converter (DAC) 221 of the AFE IC 220.

The wavelet transformer 814 converts the received digital data (a sample value system sampled at the some sample rate as that upon transmission) obtained from the AD converter (ADC) 222 of the AFE IC 220 into that on a frequency axis by a discrete wavelet conversion process. The parallel-serial converter 815 converts parallel data input as the data on the frequency axis into serial data by a sorting process, and outputs the serial data. The demapper 816 calculates an amplitude value of each subcarrier and produces reception data by determining a reception signal.

In this embodiment, the PLC modem 100 performs two processes of "transmission-rate stabilization control" and "AC sync frame length control" as characteristic control. Hereinafter, the "transmission-rate stabilization control" process will be described in a first embodiment, the "AC sync frame length control" process will be described in a second embodiment, and a combination of the transmission-rate stabilization control process and the AC sync frame length control process will be described in a third embodiment.

(First Embodiment)

Figure 5:
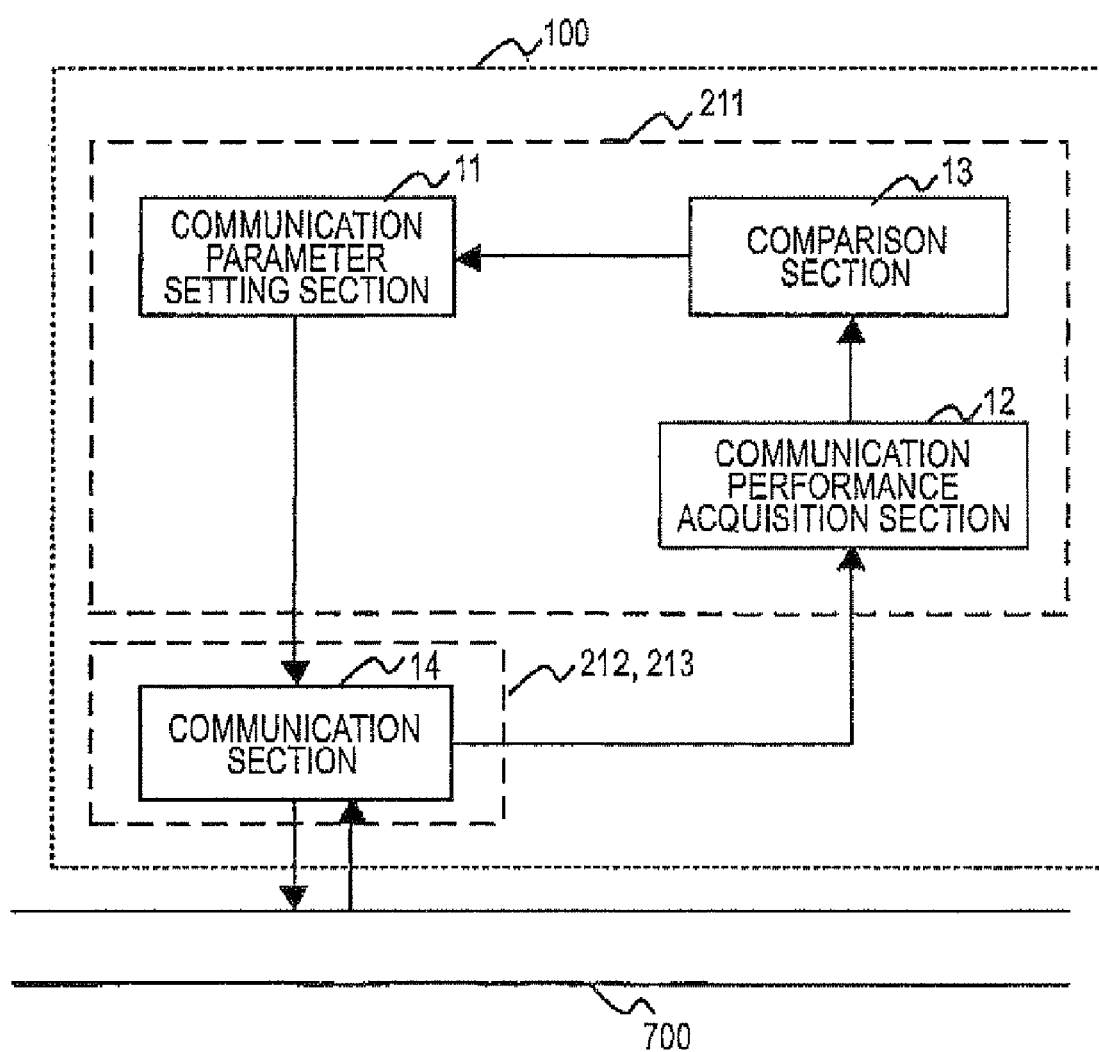
FIG. 5 is a functional diagram of the PLC modem according to a first embodiment of the present invention.

FIG. 5 is a functional block diagram of the PLC modem 100 according to the first embodiment of the present invention. The PLC modem 100 shown in FIG. 5 includes a communication parameter setting section 11, a communication performance acquisition section 12, a comparison section 13, and a communication section 14. As shown in FIG. 5, the communication parameter setting section 11, the communication performance acquisition section 12, and the comparison section 13 are functional blocks included in the CPU 211, and the communication section 14 is a functional block included in the PLC MAC block 212 and the PLC PHY block 213.

The communication parameter setting section 11 determines one TM (Tone Map) from a plurality of TMs. For example, the TMs are stored in the main IC 210 or the memory 240 and are held by combining a set of communication parameters such as a type of first-order modulation to be applied for each subcarrier of a multicarrier signal, a type of error correction mode, and the like. The PLC modem 100 is provided with one or more TMs for each counterpart modem by considering various characteristics of the transmission channel. Upon general communication, the communication parameters of one TM are set in the communication parameter setting section 11.

A plurality of TMs may be provided for one counterpart modem. That is, it is possible to hold a TM (present TM) used in communication until then and a newly generated TM (new TM) in the case where a TM is newly generated on the basis of the result of a CE request/CER to be described later when necessary. The case where the two of the present TM and the new TM are held will be described in the following. Alternatively, a plurality of present TMs may be held and the evaluation may be performed using the plurality of present TMs and the new TM.

The communication section 14 communicates with another PLC modem 100 connected to the common power line 700 using a modulation scheme corresponding to a communication parameter determined by the communication parameter setting section 11.

The communication performance acquisition section 12 acquires information regarding communication performance on the communication section 14. A frequency of occurrence of retransmission (hereinafter, also referred to as "retransmission ratio") or a transmission rate (including a data information amount, for example, the number of packets, per unit time) is considered as a specific example of the communication performance.

The comparison section 13 compares superiority and inferiority of a plurality of communication parameters using communication performance information acquired by the communication performance acquisition section 12 for each of a plurality of communication parameters. The comparison result of the comparison section 13 is output to the communication parameter setting section 11. The communication parameter setting section 11 determines a communication parameter for the next communication by reflecting the comparison result of the comparison section 13.

Next, the content of a main process of the PLC modem 100 of this embodiment will be described.

The PLC modem 100 assumes candidates of two sets of present TMs and new TMs as the TMs, and executes a process of identifying which of the two-set candidates is excellent, that is, which of the two-set candidates is suitable for the performance of the power line 700 as the transmission channel. One TM is adopted as the execution result. Here, the present TM is a TM determined or selected first. The new TM is a new candidate TM selected after the present TM.

Figure 6:
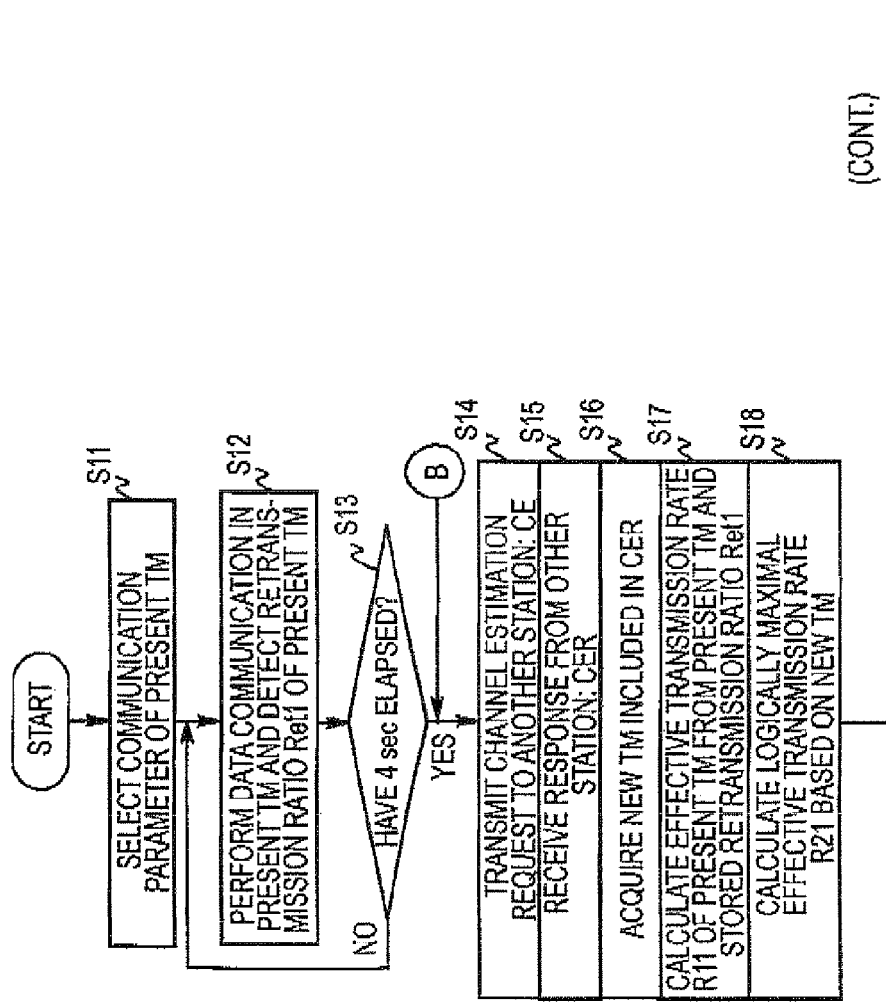
FIG. 6 is a flowchart showing an example of an operation when the PLC modem controls the stabilization of a transmission rate according to the first embodiment of the present invention.
Figure 7:
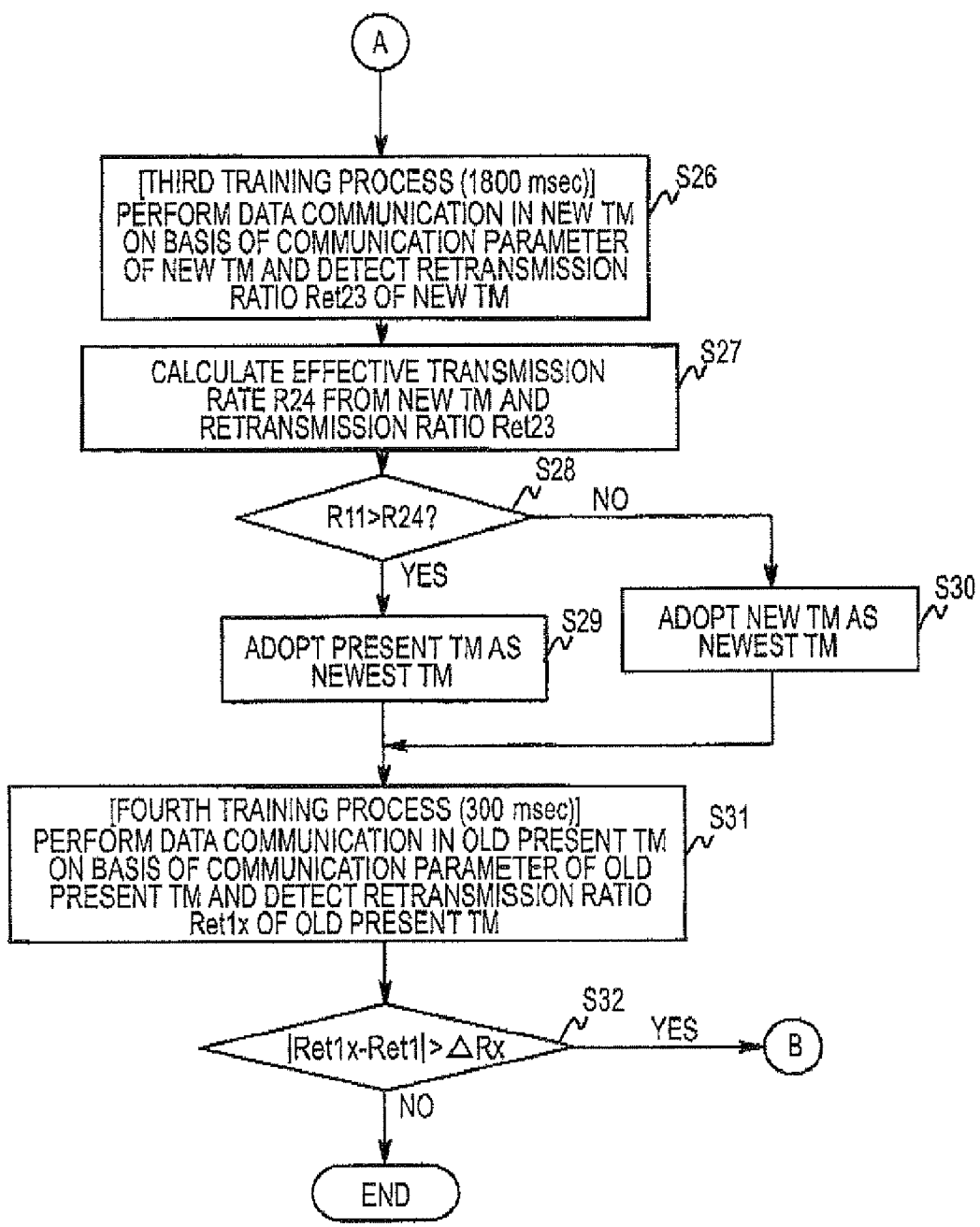
FIG. 7 is a flowchart showing an example of an operation when the PLC modem controls the stabilization of a transmission rate according to the first embodiment of the present invention.

FIGS. 6 and 7 are a flowchart showing an operation example when the PLC modem 100 executes a transmission-rate stabilization control process. Here, this will be described with reference to FIGS. 8 and 9. It is assumed that a present TM is already defined at the start time of the process of FIG. 6.

In step S11, the communication parameter setting section 11 selects the present TM and reports the present TM to the communication section 14.

In step S12, the communication section 14 determines a communication parameter on the present TM reported from the communication parameter setting section 11, and transmits arbitrary data as an object to be transmitted to the power line 700. At this time, the communication performance acquisition section 12 determines whether or not retransmission has been generated by the occurrence of transmission error, and, for example, stores information regarding a detected retransmission ratio (retransmission ratio Ret1) in the memory 240.

In step S13, the comparison section 13 identifies whether or not a predetermined time (for example, 4 sec in FIG. 8) has elapsed. When the predetermined time has elapsed, the process proceeds to the next step S14. When data to be transmitted exists until the predetermined time has elapsed, transmission is performed by a parameter based on the present TM at a predetermined timing. When data to be transmitted does not exist, dummy data only for the evaluation may be transmitted regardless of actual data. It is possible to acquire retransmission ratio information which is reliable to some extent since a retransmission ratio is observed during 4 sec.

In step S14, the communication section 14 transmits a channel estimation request (CE: Channel Estimation) to another PLC modem 100 via the power line 700. The CE includes a known signal recognized in advance by both the PLC modem 100 of its own station and the other PLC modem 100 of another station.

In step S15, the communication performance acquisition section 12 receives the CER since a channel estimation request response (CER: Channel Estimation Response) is transmitted from the other PLC modem 100. The CER includes a present TM for evaluation information for the received known signal (for example, information indicating a CINR (Carrier to Interference and Noise power Ratio) of each subcarrier of multicarrier or a transmission channel state such as transmission rate information (PHY rate) or the like based on the CINR).

Aside from the periodic operation, the CE request/CER is performed even when the present TM has not yet been defined (for example, the operation start time of the PLC modem 100) or even when the characteristic state of the power line 700 has been rapidly changed (for example, electric equipment connected to the power line 700 has undergone a great change).

In step S16, the communication parameter setting section 11 acquires a new TM included in the CER.

In step S17, the communication performance acquisition section 12 acquires the present TM and the retransmission ratio Ret1 (the detection result during 4 sec) held in step S12, and the comparison section 13 calculates an effective transmission rate of the present TM, that is, a transmission rate R11 considering retransmission, on the basis thereof.

In step S18, the comparison section 13 calculates a logically maximal effective transmission rate R21 of the new TM on the basis of the new TM selected in step S16. Specifically, the effective transmission rate R21 is calculated from the new TM by assuming that the retransmission ratio is 0. Specifically, a value obtained by multiplying a transmission rate (PHY rate) obtained from the present TM by (1−Ret1) and an efficiency coefficient $\alpha 1$ is set to R11. $\alpha 1$ is an index representing the efficiency of transmission considering the influence of an inter-frame gap or a frame length based on the PHY rate, and becomes a value between 0 and 1. In this step, retransmission ratio information regarding the "new TM" is unnecessary.

In step S19, the comparison section 13 compares the effective transmission rate R11 of the present TM calculated in step S17 with the effective transmission rate R21 of the new TM calculated in step S18. When R11 is greater than R21, the process proceeds to step S33. When it is determined that the communication performance of the present TM (the transmission rate considering the retransmission) is superior to that of the new TM, the communication parameter setting section 11 adopts a communication parameter of the present TM as a communication parameter to be used hereafter, and completes the process. On the other hand, when R11 is equal to or less than R21, the process proceeds to the next step S20.

Figure 8:
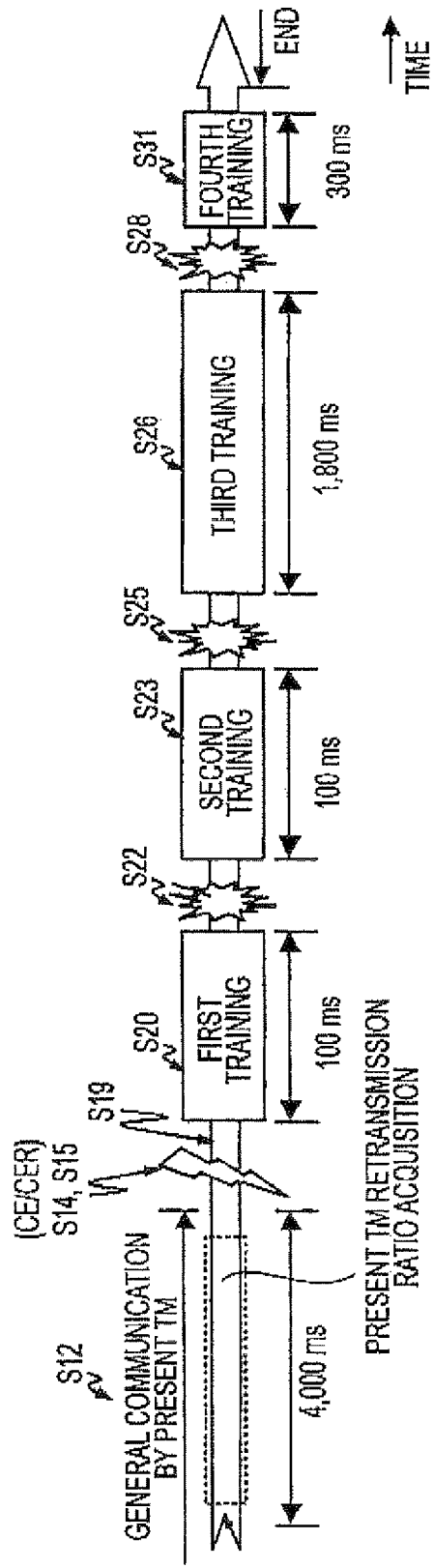
FIG. 8 is a diagram showing an example of the flow of a training process according to the first embodiment of the present invention.

That is, when the condition of step S19 is satisfied, a subsequent process is terminated and hence a "first training process", a "second training process", a "third training process", or a "fourth training process" shown in FIG. 8 is not performed. That is, if the effective transmission rate R21 of the "new TM" is less than that of the "present TM" even when the retransmission ratio is 0, the comparison result does not change even when the actual retransmission ratio of the "new TM" is acquired. An unnecessary process may be omitted by omitting a subsequent process in step S19. This is also useful for suppressing a decrease in the transmission rate.

In step S20, the PLC modem 100 executes the first training process over a predetermined time (for example, a period of 100 msec). In the first training process, the communication section 14 transmits arbitrary data as an object to be transmitted to the power line 700 using communication parameters of a new TM and a present TM. At this time, the communication performance acquisition section 12 determines whether or not retransmission has been generated by the occurrence of transmission error, and, for example, information regarding a detected retransmission ratio (retransmission ratio Ret21 of the new TM) is stored in the memory 240.

Figure 9:
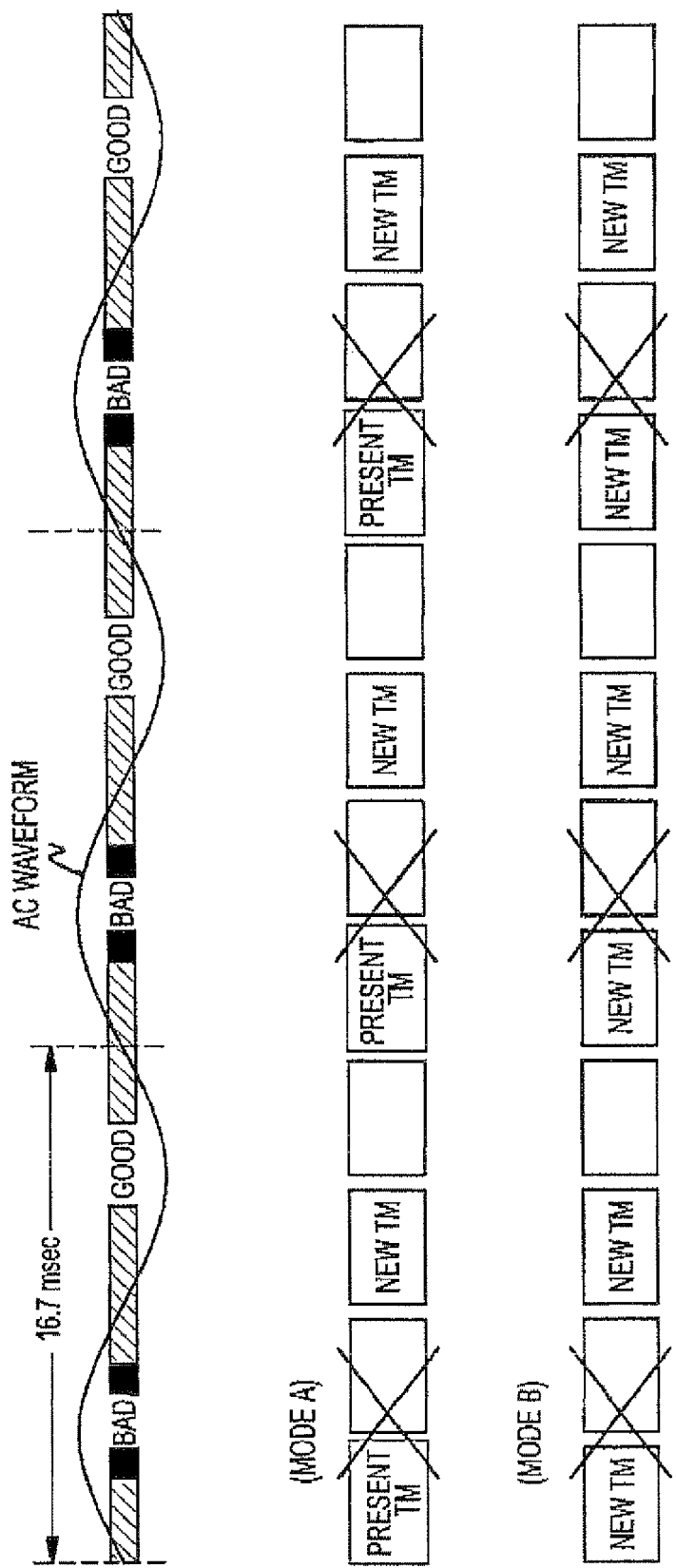
FIG. 9 is a diagram showing an example of a TM selected in a predetermined time period according to the first embodiment of the present invention.

During the first training process, communication parameters to be used by the communication section 14 are periodically alternately switched by the communication parameter setting section 11 as in a mode A shown in FIG. 9. That is, after transmission is performed twice using the present TM, the communication section 14 performs transmission twice using the new TM, and performs retransmission twice using the present TM. In the following, likewise, the communication parameter setting section 11 alternately switches the communication parameters every two transmission operations. Here, the changeover has been performed for every two transmission operations, but may be repeated for every different number of transmission operations.

In this regard, information regarding the retransmission ratio Ret21 is acquired as a communication parameter only in a period in which the communication section 14 selects the new TM. That is, the retransmission ratio Ret21 is a retransmission ratio regarding the new TM.

As in the mode A shown in FIG. 9, it is possible to prevent a transmission rate from being abnormally decreased during a training period by periodically alternately switching the present TM and the new TM. That is, there is the case where the transmission rate is noticeably decreased when only the new TM is used as in a mode B shown in FIG. 9 since there is a possibility that the transmission rate of the new TM may be extremely decreased in the step of executing the first training process. However, it is possible to respond to a decrease of a transmission rate occurring locally by alternately switching and employing the present TM and the new TM for data transmission.

For example, it is possible that the state of the transmission channel is changed to "Bad", "Good", "Bad", "Good", "Bad", or the like in synchronization with a cycle of an alternating-current power waveform (AC waveform), a degradation state is biased to one of the present TM and the new TM, and the retransmission ratio Ret21 does not correctly reflect the state of the transmission channel, when the present TM and the new TM are periodically alternately switched as in the mode A shown in FIG. 9. However, it is possible to select a best TM without reflecting a periodic degradation state by executing all training processes of this embodiment in a sufficient time length.

In step S21, the comparison section 13 calculates the effective transmission rate (the transmission rate considering retransmission) R22 of the new TM on the basis of the new TM and the retransmission ratio Ret21 acquired in step S20.

In step S22, the comparison section 13 compares the effective transmission rate R11 of the present TM calculated in step S17 with the effective transmission rate R22 of the new TM calculated in step S21. Here, ΔR is a predetermined threshold (for example, an integer). When R11 is greater than a sum of R22 and ΔR, the process proceeds to step S33. When it is determined that the communication performance of the present TM (the transmission rate considering retransmission) is superior to that of the new TM, the communication parameter setting section 11 adopts the communication parameter of the present TM as a communication parameter to be used hereafter, and the process is completed. Otherwise, the process proceeds to step S23.

That is, when the condition of step S22 is satisfied, a subsequent process is terminated and hence the "second training process", the "third training process", or the "fourth training process" shown in FIG. 8 is not performed. That is, there is a high possibility that the comparison result may not be changed even when a subsequent process is continued to acquire a more exact retransmission ratio in the case where the effective transmission rate R22 of the new TM is lower than that of the present TM even in the condition to which the threshold ΔR is added. An unnecessary process may be omitted by terminating the process in step S22. This is also useful for suppressing a decrease in a transmission rate.

In step S23, the PLC modem 100 executes the second training process over a period of 100 msec. The content of the second training process is the same as that of the first training process, but information acquired by the second training process is set as a retransmission ratio Ret22 acquired from two processes of the first training process and the second training process, wherein the retransmission ratio Ret22 is distinguished from the retransmission ratio Ret21.

That is the second training process is further executed over a period of 100 msec after the first training process is executed over the period of 100 msec as shown in FIG. 8. The retransmission ratio of the new TM is acquired over 200 msec in total.

In step S24, the comparison section 13 calculates an effective transmission rate R23 of the new TM on the basis of the new TM and the retransmission ratio Ret22 acquired in steps S20 and S23. Specifically, a value obtained by multiplying the transmission rate (PHY rate) obtained from the new TM by (1-Ret22) and an efficiency coefficient α2 is set to R23. α2 is an index representing the efficiency of transmission considering the influence of an inter-frame gap or a frame length based on the PHY rate, and becomes a value between 0 and 1. α1 and α2 may simply use the same value.

In step S25, the comparison section 13 compares the effective transmission rate R11 of the present TM calculated in step S17 with the effective transmission rate R23 of the new TM calculated in step S24. When R11 is greater than R23, the process proceeds to step S33. When it is determined that the communication performance of the present TM (the transmission rate considering the retransmission) is superior to that of the new TM, the communication parameter setting section 11 adopts a communication parameter of the present TM as a communication parameter to be used hereafter, and completes the process. Otherwise, the process proceeds to the next step S26.

That is, when the condition of step S25 is satisfied, a subsequent process is terminated and hence the "third training process", or the "fourth training process" shown in FIG. 8 is not performed. That is, there is a high possibility that the comparison result may not be changed even when a subsequent process is continued to acquire a more exact retransmission ratio in the case where the effective transmission rate R23 of the new TM is lower than that of the present TM. An unnecessary process may be omitted by terminating the process in step S25. This is also useful for suppressing a decrease in a transmission rate.

In step S26, the PLC modem 100 executes the third training process over a period of 1800 msec. In the third training process, the communication section 12 transmits arbitrary data as an object to be transmitted to the power line 700 using a communication parameter of the new TM. At this time, it is determined whether or not retransmission has been generated by the occurrence of transmission error, and, for example, information regarding a detected retransmission ratio (retransmission ratio Ret23 of the new TM) is stored in the memory 240.

The third training process is different from the first training process, and fixes and uses a communication parameter of the new TM over the total period of 1800 msec. That is, a great decrease in a transmission rate may not occur even when the present TM is not used since a possibility that the transmission rate of the new TM is extremely low becomes low in the step in which the transition to the third training process has been taken. For example, it is possible to acquire the retransmission ratio Ret23 reflecting an average characteristic within a cycle even when the state of the power line 700 periodically changes as shown in FIG. 9 on the basis of the communication parameter of the new TM.

A time length in which the third training process is executed is different from those of the first training process and the second training process, and is relatively long as 1800 msec. Thus, it is possible to acquire retransmission ratio information with higher accuracy. It is preferable that the time length of the third training process should be at least five times longer than a sum of the period of the first training process (100 msec) and the period of the second training process (100 msec). It is desirable to set the length of the third training process to about half the time (4 sec) in which step S12 is executed so that the time lengths of the first to third training processes are not excessively long since the process shown in FIGS. 6 and 7 is repeated.

In step S27, the comparison section 13 calculates an effective transmission rate R24 of the new TM on the basis of the new TM and the retransmission ratio Ret23 acquired in step S26. Specifically, a value obtained by multiplying the transmission rate (PHY rate) obtained from the new TM by (1−Ret23) and the efficiency coefficient α2 is set to R24. α2 is equal to a value used in step S24. Ret23 may be set as the retransmission ratio regarding the new TM produced from all processes of the first training process, the second training process, and the third training process.

In step S28, the comparison section 13 compares the effective transmission rate R11 of the present TM calculated in step S17 with the effective transmission rate R24 of the new TM calculated in step S27. When R11 is greater than R24, the process proceeds to step S29. Otherwise, the process proceeds to step S30.

In step S29, the communication parameter setting section 11 adopts a communication parameter of the present TM as a communication parameter to be used hereafter since it has been determined that the communication performance of the present TM (the transmission rate considering the retransmission) is superior to that of the new TM as the evaluation result until then.

In step S30, the communication parameter setting section 11 adopts a communication parameter of the new TM as a communication parameter to be used hereafter since it has been determined that the communication performance of the new TM (the transmission rate considering the retransmission) is superior to that of the present TM as the previous evaluation result.

In step S31, the PLC modem 100 executes the fourth training process over a period of 300 msec. The fourth training process is executed regardless of the comparison result of step S28. That is, arbitrary data as an object to be transmitted is transmitted to the power line 700 using a communication parameter of a previous present TM (an old present TM) to execute steps S29 and S30. At this time, it is determined whether or not retransmission has been generated by the occurrence of transmission error, and, for example, information regarding a detected retransmission ratio (retransmission ratio Ret1x of the old present TM) is stored in the memory 240. In the fourth training process, a used communication parameter is fixed to a communication parameter of the old present TM over the total period of 300 msec.

In step S32, in the case where a difference of at least a predetermined threshold ΔRx is generated when the retransmission ratio Ret1x is compared with the retransmission ratio Ret1 acquired in S12 or the retransmission ratio Ret1y previously acquired by the same present TM, the comparison section 13 determines that characteristics of the power line 700 undergo a great change as compared with those of the first to third training processes, and a parameter of the present TM after steps S29 and S30 set by training is not available. In this case, a CE request/CER is executed and a process for the transmission channel after the change is newly started. Otherwise, the process ends.

Since about 2 sec are necessary until the first to third training processes end and this is actually repeated several times, the fourth training process may identify that a TM produced by the first to third training processes by the influence of a characteristic change of the power line 700 during this period is surely available. It is identified that a great change does not occur in the state of the transmission channel by referring to the retransmission ratio Ret1x by the fourth training process, and it is guaranteed that the reliability of the TM adopted in steps S29 and S30 is high. An object of the fourth training process is not limited to the retransmission ratio for detecting a transmission channel change. The transmission channel change may be detected by comparing a value of the same index acquired before step S14 with another index, for example, an error correction ratio, an index such as a transmission rate or the like, and a combination thereof.

It is possible to determine correctly whether a communication parameter of one of a TM before the change and a TM after the change is superior or proper before the changeover of a present TM and a new TM is performed by executing the process of FIGS. 6 and 7. For example, a higher data transmission rate is obtained in the case where the communication parameter after the change is used as compared with the case where the communication parameter before the change is used, but instead a retransmission ratio may be increased and a situation where an execution rate is decreased may be avoided.

It is possible to select an exact TM even when noise is periodically generated by an alternating current on the power line 700.

It is possible to select an exact TM by executing the first to fourth training processes in a sufficient time to determine the transmission channel state even when large noise is generated on the power line 700 in a short period.

It is possible to avoid a large retransmission ratio deviation between the present TM and the new TM since the effective transmission rate R11 used during the process shown in FIGS. 6 and 7 is based on the stored retransmission ratio Ret1 pre-detected in the general data transmission before the training process is started.

Even when large noise incidentally appears on the transmission channel at the time of selecting the new TM, a training process using a TM of an extremely low transmission rate affected by the noise is not performed. Accordingly, it may be avoided that the changeover to an abnormally low transmission rate is temporarily or momentarily made and the transmission rate becomes unstable.

There is a possibility that an adverse effect (bias) may be generated when the present TM and the new TM are alternately switched in terms of a retransmission ratio acquired by the first training process or the second training process. However, the adverse effect is not reflected in TM selection since a communication parameter is fixed to a communication parameter of the new TM in the third training process. A retransmission ratio is obtained with high accuracy since a period of the third training process is sufficiently longer than those of the first training process and the second training process.

Specifically, since various types of noise appear on the power line 700 when the power line 700 is used as the transmission channel, communication characteristics are changed and the transmission rate is easily decreased or the frequency of occurrence of retransmission is easily increased. It is possible to perform stable communication by selecting a communication parameter of a proper TM.

The power line communication system using the power line as the transmission channel has been described as a communication system in this embodiment, but, for example, a wireless system including a communication device such as a wireless LAN or the like may be applied in this embodiment.

(Second Embodiment)

Figure 10:
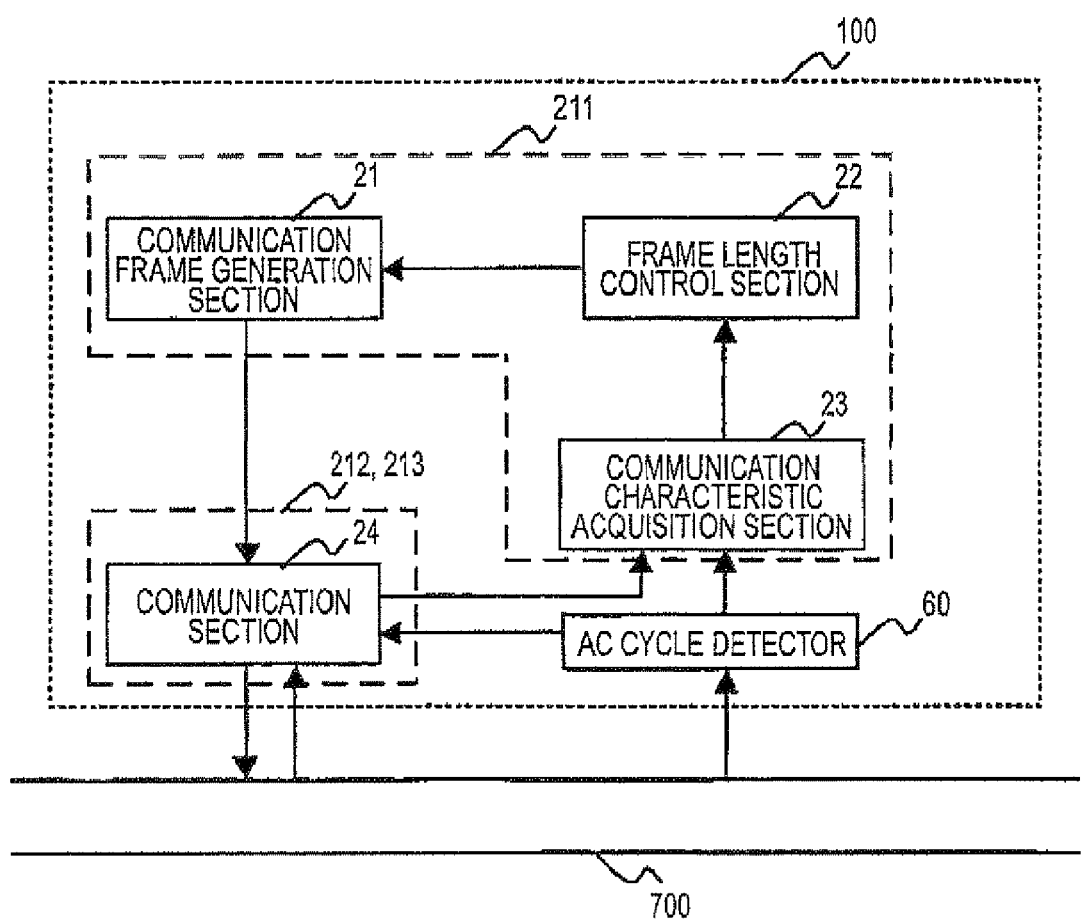
FIG. 10 is a functional block diagram of the PLC modem according to a second embodiment of the present invention.

FIG. 10 is a functional block diagram of a PLC modem 100 in the second embodiment of the present invention. The PLC modem 100 shown in FIG. 10 includes a communication frame generation section 21, a frame length control section 22, a communication characteristic acquisition section 23, and a communication section 24. As shown in FIG. 10, the communication frame generation section 21, the frame length control section 22, and the communication characteristic acquisition section 23 are functional blocks included in the CPU 211. The communication section 24 is a functional block included in the PLC MAC block 212 and the PLC PHY block 213.

The communication frame generation section 21 determines a frame length on the basis of a control signal output from the frame length control section 22, and generates a communication frame of the frame length.

Also, the communication frame generation section 21 does not send the communication frame at a time (a Z change point) when an impedance in the power line 700 is changed. This impedance change point will be described later. By this configuration, an error of the communication frame is suppressed, a retransmission rate of the communication frame is reduced, and a communication efficiency can be increased.

The communication section 24 stores a data packet to be transmitted in the communication frame generated by the communication frame generation section 21 and transmits a PLC frame to the power line 700. The success/failure of the reception of previous reception data is determined by receiving a response frame.

The communication characteristic acquisition section 23 detects an impedance change point (hereinafter, also referred to as a Z change point) in the power line 700 as a communication characteristic on the basis of an actual communication state of the PLC frame transmitted by the communication section 24. Communication characteristics include transmission channel characteristics with the impedance. Here, it is assumed that the Z change is periodically generated. The communication characteristics are output as relative timing information within one cycle of an alternating-current power waveform in synchronization with a sync signal output by the AC cycle detector 60.

The frame length control section 22 generates a control signal for controlling a frame length on the basis of the timing of the communication characteristic acquired by the communication characteristic acquisition section 23. That is, a frame length is limited so that the PLC frame is not transmitted at the timing in the vicinity of the Z change point.

As in the first embodiment, TMs are stored in the main IC 210 or the memory 240 and are held by combining a set of various types of communication parameters.

The content of a main process of the PLC modem 100 of this embodiment will be described.

Figure 11:
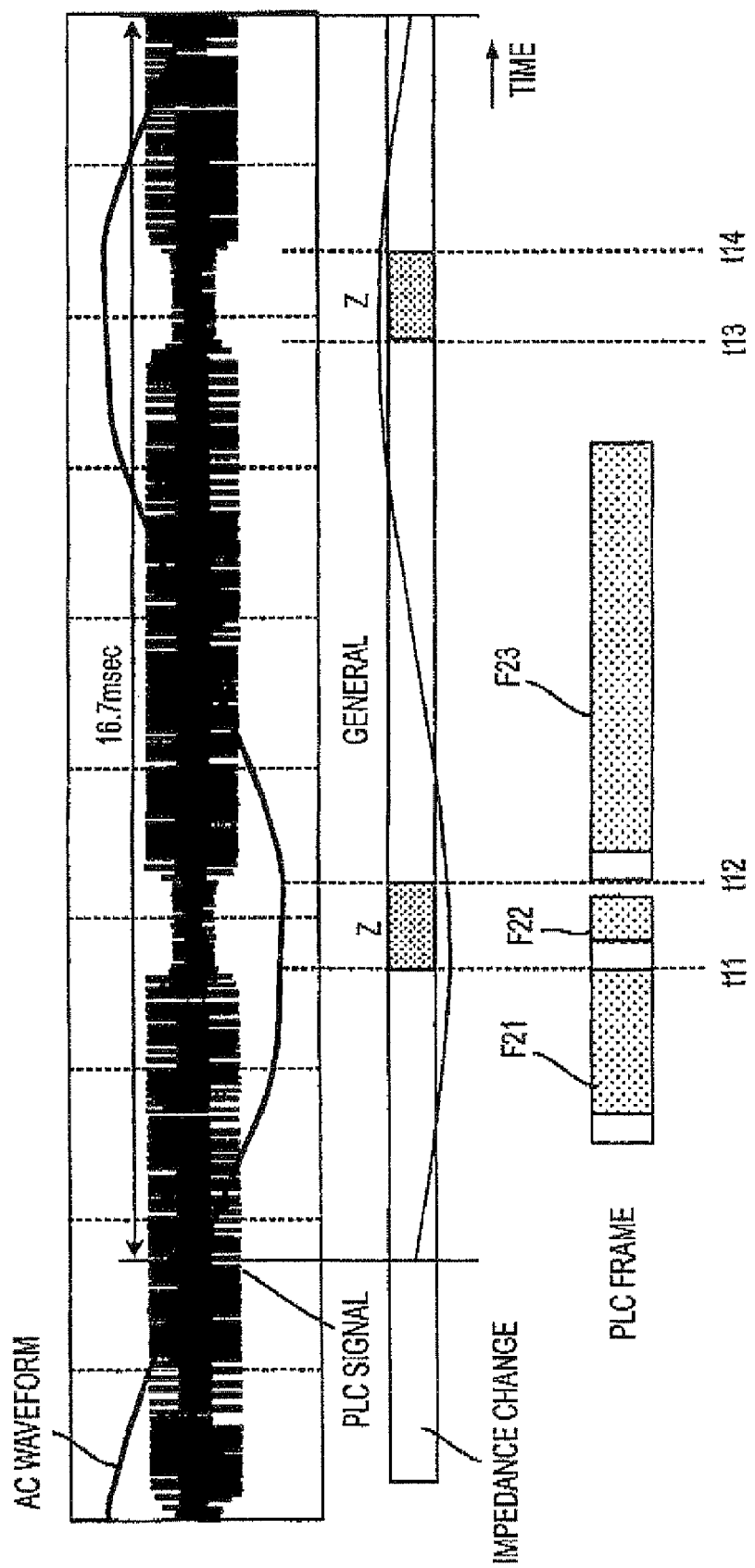
FIG. 11 is a diagram showing an example of a communication frame considering a Z change period according to the second embodiment of the present invention.

The length of each frame is limited so that no PLC frame is transmitted at times t11, t12, t13, and t14 (Z change points) at which the impedance of the power line 700 changes as in PLC frames F21, F22, and F23 shown in FIG. 11. Thus, it is possible to prevent a packet transmission error from being generated by the influence of impedance change (hereinafter, also referred to as Z change) synchronized with an alternating-current power waveform as shown in FIG. 11. This is an outline of AC sync frame length control.

It is necessary to determine correctly the Z change point so as to control an AC sync frame length. In this embodiment, a PLC frame is transmitted and a Z change point is detected on the basis of the situation of transmission error generated in the PLC frame. That is, it possible to recognize the Z change point from the transmission error generated actually since the transmission error is generated by a rapid change of transmission channel characteristics at the Z change point when the PLC frame is transmitted. To detect the Z change point, the PLC modem 100 repeatedly transmits a large number of data frames to another PLC modem 100, and receives a response signal (PLC-ACK) with the transmission result for each data frame from the other PLC modem 100.

Figure 12:
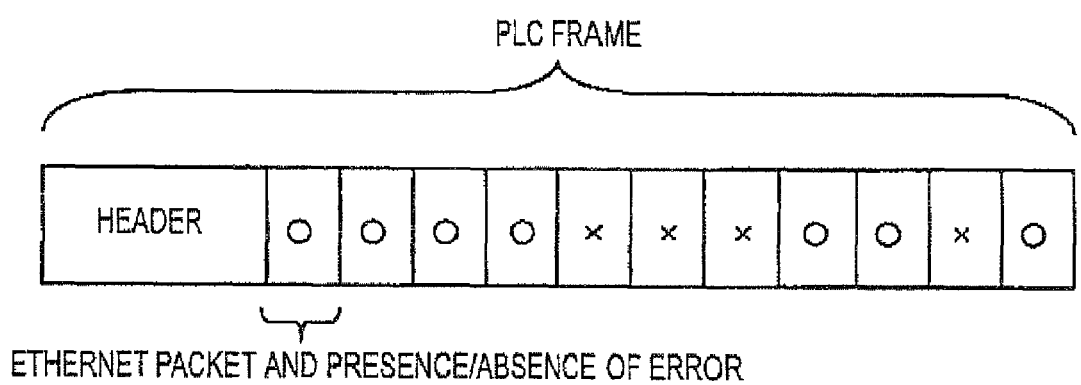
FIG. 12 is a diagram showing a transmission frame of a PLC frame (including the transmission result) to be transmitted by the PLC modem according to the second embodiment of the present invention.

For example, a PLC frame transmitted by the PLC modem 100 is constituted as shown in FIG. 12. That is, the PLC frame includes a header and a large number of (about 30) Ethernet packets (hereinafter, simply referred to as packets) continuously connected thereto. When transmission error is generated by a Z change or noise, the presence/absence of error may be identified for each packet (each transmission period in which a packet is transmitted). In FIG. 12, an error-free packet is denoted by O, and an error packet is denoted by X. The presence/absence of error of each packet may be identified by information included in PLC-ACK, for example, bit-map information in which the absence of error (normal reception) is set to 1 and the presence of error (reception failure) is set to 0.

For example, the PLC modem 100 stores a "bitmap queue" for storing information regarding a list of transmission results of a PLC frame in the main IC 210 or the memory 240. The bitmap queue stores frame transmission information. Specifically, in terms of each transmitted PLC frame, information (bitmap information) indicating the timing when transmission is performed within an AC cycle, one frame length (which is a frame transmission time and is changed by a TM, an Ethernet packet length, or the like), the number of packets connected in one frame, and the presence/absence of error of each packet is included. The PLC modem 100 generates in error map on the basis of information stored in the bitmap queue. That is, the error map is obtained by accumulating information regarding the presence/absence of transmission error indicating the transmission result of a PLC frame.

In the above-described information, the timing when the PLC frame has been transmitted within an AC cycle may be produced by measuring a passage time on the basis of the timing when a sync signal output from the AC cycle detector 60 appears.

Figure 13:
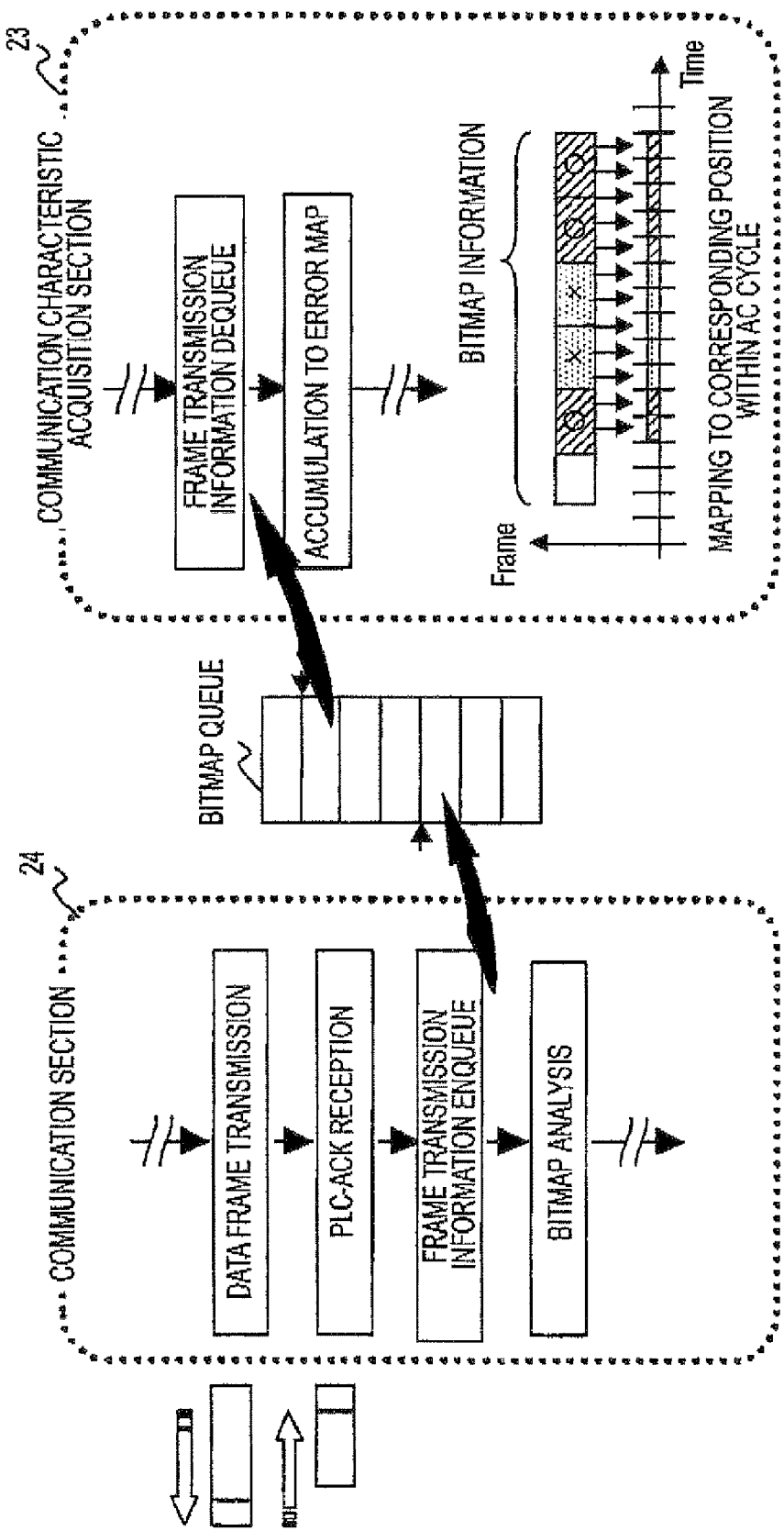
FIG. 13 is a diagram showing an example of a communication section, a communication characteristic acquisition section, and a bitmap queue provided in a main IC according to the second embodiment of the present invention.

As shown in FIG. 13, the PLC modem 100 includes the communication section 24, the CPU 211, and particularly the communication characteristic acquisition section 23, which are used to generate the above-described error map.

The communication section 24 transmits a PLC frame to another PLC modem 100, and receives PLC-ACK as a response from the other PLC modem 100. The PLC-ACK includes bitmap information indicating the success/failure of communication. Frame transmission information including this bitmap information is written to the bitmap queue. As necessary, the content of the bitmap queue is analyzed and a separate retransmission process or the like is executed.

The communication characteristic acquisition section 23 sequentially extracts and analyzes information (frame transmission information) from the bitmap queue, and establishes and stores an error map. The error map is obtained by holding information representing the frequency of occurrence of error for each predetermined time period within an AC cycle (for example, 16.7 msec). That is, the communication characteristic acquisition section 23 maps information representing the presence/absence of each data frame to a time position of a corresponding packet on the error map on the basis of frame transmission information extracted from the bitmap queue. A time of each packet may be detected on the basis of a transmission start time of a data frame including the packet and an alignment sequence of a corresponding packet (a distance from a frame header, that is, a transmission time of a packet unit).

The transmission start time within the AC cycle is determined on the basis of an input from the AC cycle detector 60, but the AC cycle detector 60 may have a form of detecting a half or full cycle of power by an implementation method thereof. A determination is possible in each pattern by assuming whether to take either or by assuming a connection of information of two continuous half cycles of power as the full cycle of power. In this embodiment, either cycle signal may be used.

The process of the communication section 24 transmits a PLC data frame and is performed whenever its PLC-ACK is received. That is, information regarding a plurality of frame transmissions is accumulated, and the communication characteristic acquisition section 23 generates an error map based on the information.

Next, the content of a specific error map will be described.

Figure 14:
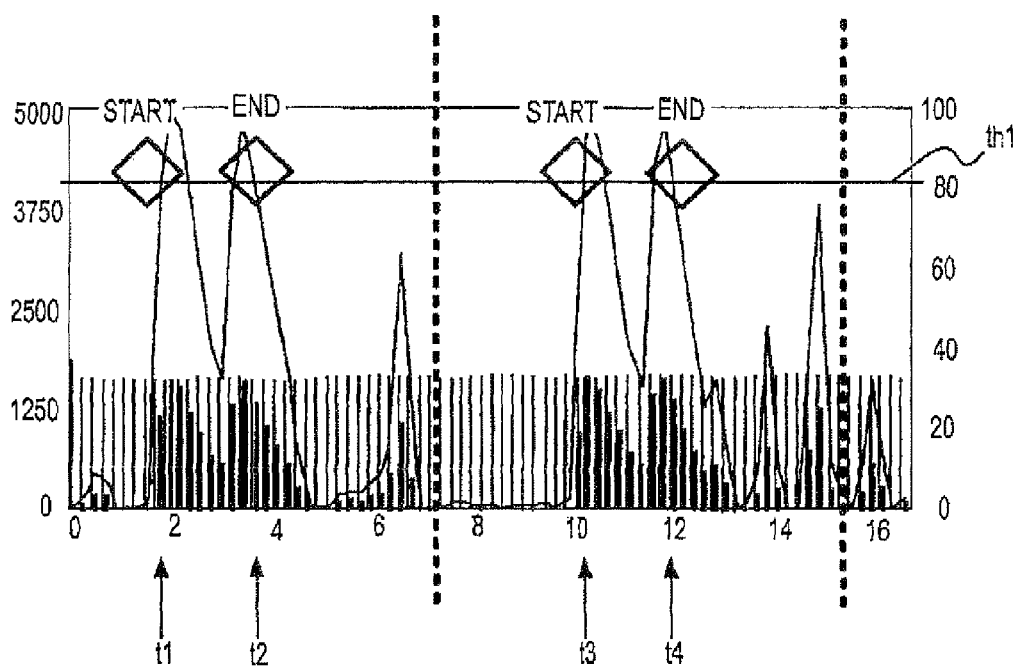
FIG. 14 is a diagram showing a specific example of the content of an error map according to the second embodiment of the present invention.

FIG. 14 shows a specific example of the content of the error map. In FIG. 14, the traverse axis represents a time (msec) within one cycle, and the longitudinal axis represents an error ratio (the number of error occurrences around the total number of transmissions within a certain time: the accumulated number of X values in the bitmap information). The content shown in FIG. 14 represents the content of about one AC cycle. In FIG. 14, 0 of the time axis corresponds to a reference timing (for example, a zero-crossing point) determined on the basis of a sync signal output by the AC cycle detector 60. When the frequency of the commercial alternating-current power is 60 Hz, a range of 15.4 to 7.0 msec and a range of 7.0 to 15.4 msec in the error map are respectively defined as content of half cycles of the first and second halves. The reason why the first and second halves are defined is that the detection accuracy (±1 msec) of the AC cycle detector 60 or the end time of a general impedance change (around 5.5 msec) has been considered. When the frequency of the commercial alternating-current power is 50 Hz, a range of 17.0 to 7.0 msec and a range of 7.0 to 17.0 msec in the error map are respectively defined as content of half cycles of the first and second halves. The reason why the first and second halves are defined is that the detection accuracy (±1 msec) of the AC cycle detector 60 or the end time of a general impedance change has been considered.

Referring to FIG. 14, it can be seen that the error ratio is significantly worsened in each of a time period of t1 to t2 within one half cycle and a time period of t3 to t4 within the other half cycle. That is, it is conceivable that the Z change is generated on the power line 700 in the vicinity of times t1, t2, t3, and t4 in FIG. 14, and its influence is reflected in the error map.

It is possible to detect results obtained by comparing the error ratio of each time with a threshold (for example, an integer) th1 with respect to times t1, t2, t3, and t4 in FIG. 14. In this embodiment, a maximum of four impedance change points is detected in one cycle. The change point is used as a change point for controlling a frame length (hereinafter, referred to as FL). Hereinafter, the change point may also be referred to as an FL control change point. In the error map shown in FIGS. 14, t1, t2, t3, and t4 correspond to four FL control change points. Here, t1 to t4 are time components when the error ratio reaches the threshold th1. Here, the change "point" is used, but the "point" may represent a "time period" since one cycle is divided into predetermined time periods in FIG. 14.

Figure 15:
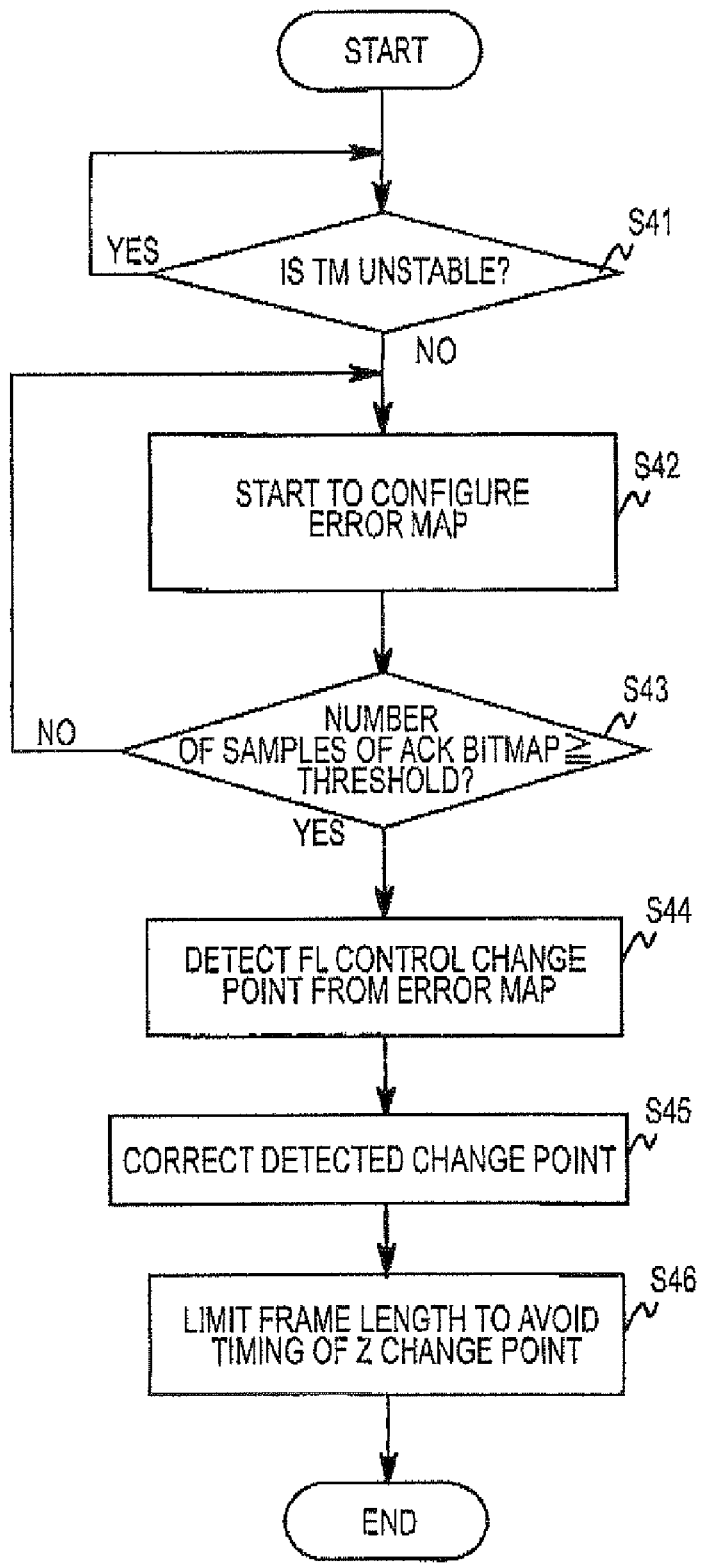
FIG. 15 is a flowchart showing an example of an operation when the PLC modem controls an AC sync frame length according to the second embodiment of the present invention.

Next, the operation when the PLC modem 100 controls an AC sync frame length will be described. FIG. 15 is a flowchart showing an example of the operation when the PLC modem 100 controls the AC sync frame length.

In step S41, the frame length control section 22 identifies whether a tone map (TM) adopted by the PLC modem 100 as a communication parameter is in an unstable state or waits for the tone map to be stable. For example, there is a high possibility that an inappropriate tone map for the state of the transmission channel is adopted and communication is performed immediately after the power of the PLC modem 100 is applied. When an error map is generated in the state, content depending upon the inappropriate tone map is reflected in the error map, and the frame length may not be appropriately controlled. It waits for the tone map to be stable. For example, after the power of the PLC modem 100 is applied, the process proceeds to the next after waiting until a predetermined time has elapsed. Step S41 may be omitted.

In step S42, the communication section 24 repeats the transmission of a communication data frame, receives PLC-ACK to the transmitted frame, and the communication characteristic acquisition section 23 generates an error map on the basis of the content of frame transmission information including bitmap information in which PLC-ACK reflecting the transmission result is included.

In step S43, the frame length control section 22 identifies whether the number of samples of frame transmission acquired by the communication characteristic acquisition section 23 is equal to or greater than a threshold (for example, an integer). When the number of transmitted data frames is less than the threshold, the process of step S42 is continued. When the number of transmitted data frames is equal or greater than the threshold, the process proceeds to step S44. It is possible to generate an error map with high accuracy when the threshold is large.

In step S44, the communication characteristic acquisition section 23 detects, for example, four FL control change points, from the error map, for example, like times t1, t2, t3, and t4 shown in FIG. 14. Here, a point at which the error ratio first exceeds the threshold th1 is detected as a start point (t1 or t3) between the commencement and the termination of each half cycle of the error map, and the last point at which the error ratio is less than the threshold th1 is detected as an end point (t2 or t4).

In step S45, the frame length control section 22 corrects an FL control change point detected in step S44. For example, the FL control change point detected by a process like steps S42 to S44 tends to be shifted slightly back from an actual Z change point.

In step S45, the FL control change point detected in step S44 is corrected as follows.

When a Z change start point (for example, t1 of FIG. 14) is the same as the time of the end point (for example, t2 of FIG. 14), that is, when one point momentarily exceeds the threshold th1, only the one point is adopted as an FL control change point.

When the width between the start and end points of the Z change is wide (for example, t2−t1>thx (threshold)), each of the start and end points is moved forward by a predetermined quantity. When the width between a start point P1 and an end point P2 of the change point is wide in the example shown in FIG. 16A, a detection point is a point after correcting each of points P1a and P2a obtained by respectively moving P1 and P2 forward by 200 μsec. Thus, it is possible to promote the improvement of efficiency by avoiding a transmission error.

When the width between the start point and the end point of the Z change is narrow (for example, t2−t1<thx (threshold)), only the end point is moved backward by a predetermined quantity. When the width between the start point P1 and the end point P2 of the change point is narrow in the example shown in FIG. 16B, a detection point is a point after correcting a point P2a obtained by respectively moving P2 backward by 200 μsec. Thus, it is possible to surely prevent a PLC frame from appearing in a Z change period.

In FIGS. 16A and 16B, "BO" denotes a back-off time. Step S45 may be omitted.

In the correction of the FL control change point, the start point P1 may be shifted forward by a predetermined quantity (for example, 200 μsec), and the end point P2 may be shifted backward by a predetermined quantity (for example, 200 μsec). Thus, it is possible to surely prevent a PLC frame from appearing in a Z change period.

In step S46, the frame length control section 22 limits a frame length to be generated by the communication frame generation section 21 to avoid the timing of the Z change point. For example, when the PLC frame FL21 shown in FIG. 11 is generated, the length of the frame FL21 (or the number of packets stored therein) is limited so that the timing when the last packet of the frame FL21 appears on the power line 700 ends earlier than time t1 corresponding to the Z change point. The remaining data which has not been transmitted in the frame FL21 is controlled to be stored in a subsequent frame (FL22 or FL23).

According to the PLC modem 100 of this embodiment as described above, it is possible to prevent a PLC frame from being transmitted at a Z change point. It is possible to improve the efficiency of transmission as a result of reducing a retransmission ratio.

Next, a modified example of a process for detecting an FL control change point from an error map will be described with reference to FIG. 17.

In step S101, the communication characteristic acquisition section 23 refers to the content of the error map, identifies whether an error ratio exceeding a predetermined threshold th1 exists, and proceeds to the next step S102 in the case of existence.

In step S102, the communication characteristic acquisition section 23 extracts only data of which the error ratio is equal or greater than the threshold from the error map. Thus, a small noise component is eliminated. That is, noise in which the error ratio is low is neglected since the effect of FL control is not particularly expected. Thus, the subsequent process is simplified.

In step S103, the communication characteristic acquisition section 23 performs a labeling process for specifying data of each period for each period in which a state in which the error ratio exceeds a threshold is continuous with respect to the data extracted in step S102. In this case, first, an end point of each continuous period is detected. That is, the timing of the end point is emphasized since a back side of the change is important so as to avoid the Z change. Subsequently, in each continuous period, a sum of error ratios within the period is calculated. Data of the sum which is equal to or less than a threshold (for example, an integer) is excluded. Thus, an impulse noise component is eliminated. In each continuous period, a start point at which an period width (a time width from the start point to the end point) is equal to or greater than a threshold (for example, an integer) is also detected. Thus, it is possible to respond to the Z change of which the change width is wide. When a large number of Z change periods exist, priorities are assigned in order of a start point, an end point, and a middle point therebetween.

In step S104, the communication characteristic acquisition section 23 rearranges data of each continuous period detected in step S103 on the basis of the priorities in order of the end point, the start point, and the middle point therebetween.

In step S105, the communication characteristic acquisition section 23 detects the top four end points as FL control change points from among data of continuous periods ranked in step S104. As in the process shown in FIGS. 16A and 16B, a timing correction process may be executed even for the FL control change points detected here.

When the number of end points detected in step S105 is under 4, the control may be directly performed under 4 points. Four FL control change points may be detected in total by also adding the start point corresponding to the detected end to the detected FL control change points.

The FL control is not limited to the four FL control change points. When 4 or more points have been detected, all the detection points may be defined as FL control points.

Figure 17:
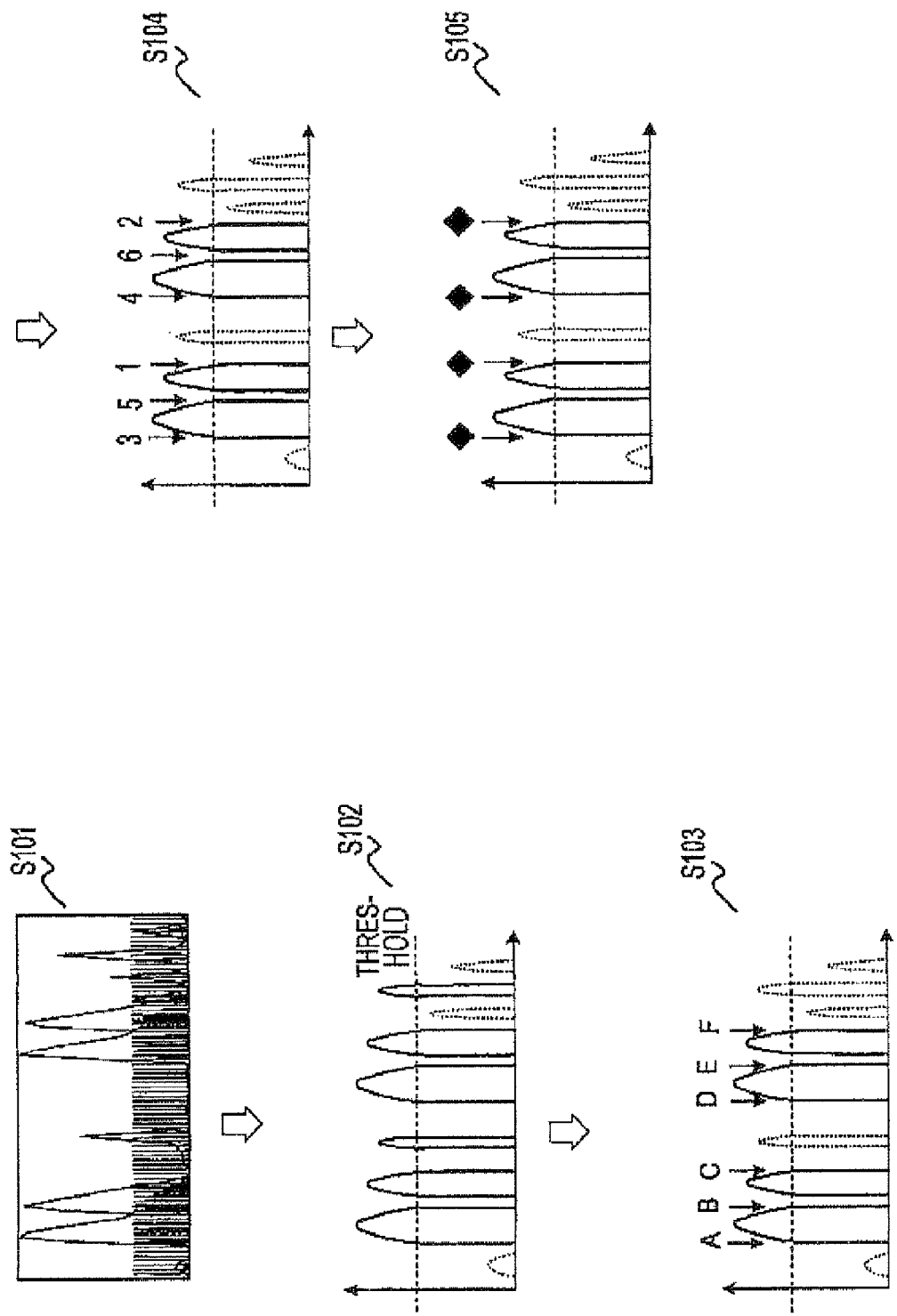
FIG. 17 is a diagram showing a modified example of a process for detecting a Z change point from an error map according to the second embodiment of the present invention.

It is possible to determine exactly the Z change point and to perform a desired frame length control operation even by the process of FIG. 17.

Next, a method in which the PLC modem 100 determines ON/OFF of the FL control function will be described.

When the frame length is limited as described above, retransmission is difficult to be generated and the reduction of a transmission rate is degraded. Accordingly, the good result may be obtained when the frame length is not limited in the case where the power line 700 as the transmission channel and a plurality of PLC modems perform transmission and are mixed, that is, in a situation where a large amount of traffic is generated. When transmission from one PLC modem to a plurality of PLC modems is performed, a transmission channel characteristic for each is different. For example, there is the case where data for a PLC modem affected by the Z change and a PLC modem not affected by the Z change is mixed. In this case, the efficiency of transmission may be significantly decreased. In consideration of this case, ON/OFF of the FL control function is determined. It is assumed that an FL control change point (step S44 described above) is detected from the error map.

Specifically, the communication characteristic acquisition section 23 collects traffic information, and the frame length control section 22 determines ON/OFF of the frame length limiting function on the basis of the collected traffic information.

Figure 18:
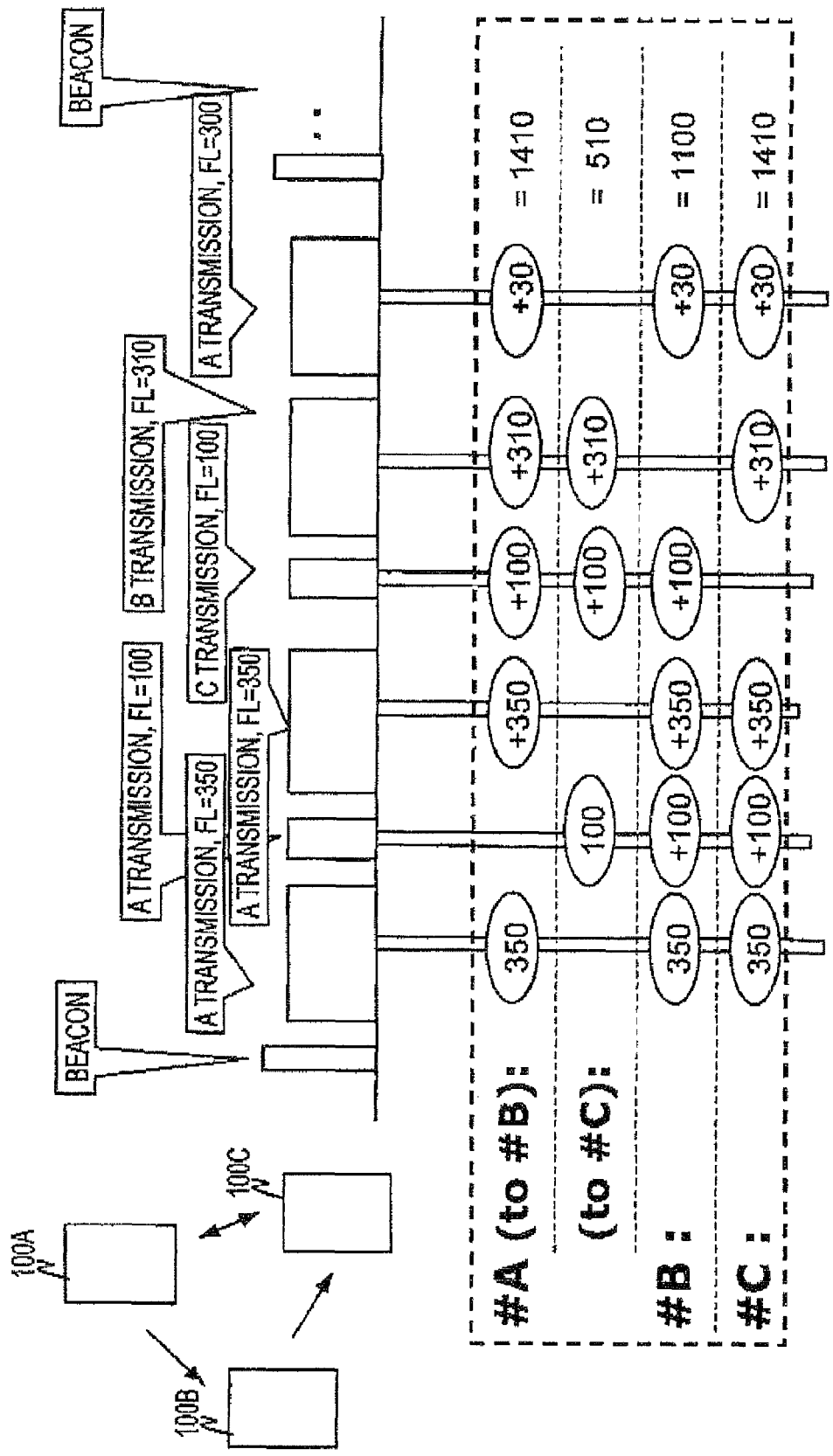
FIG. 18 is a diagram showing an example of PLC frames and beacons on a power line transmitted from a plurality of PLC modems according to the second embodiment of the present invention.

For example, when three PLC modems of the PLC modems 100A, 100B, and 100C are connected to the common power line 700, a PLC frame as shown in FIG. 18 appears on the power line 700 by transmission of each PLC modem 100.

In the example shown in FIG. 18, the PLC modem 100A transmits a PLC frame having a frame length (FL) of 350 to the PLC modem 1000 after a first beacon signal appears. The PLC modem 100A subsequently transmits a PLC frame of FL=100 to the PLC frame 100B and then transmits a PLC frame of FL=350 to the PLC modem 100C. Furthermore, the PLC modem 1000 transmits a PLC frame of FL=100 to the PLC modem 100A. The same transmission operation is repeated. In this case, each PLC modem 100 detects each PLC frame appearing on the power line 700, and recognizes a traffic state. For example, it is possible to employ a sum of lengths of PLC frames appearing on the power line 700 from when one beacon signal appears to when the next beacon signal appears as a traffic value. In the example shown in FIG. 18, a value of PLC frame traffic transmitted from the PLC modem 100A to the PLC modem 100B is detected as 1410. A value of PLC frame traffic transmitted from the PLC modem 100A to the PLC modem 100C is detected as 510. A value of PLC frame traffic transmitted from the PLC modem 100B to the PLC modem 100C is detected as 1100. A value of PLC frame traffic transmitted from the PLC modem 100C to the PLC modem 100A is detected as 1410.

That is, as shown in FIG. 18, the communication section 24 detects a sum of PLC frame lengths (FLs) of PLC frames transmitted from other PLC modems and counterpart-specific PLC frames of its own PLC modem appearing between two beacon signals adjacent to each other. A detected FL sum is compared with a threshold, for example, "600". It is determined that it is crowded when the sum is greater than the threshold. It is determined that it is empty when the sum is less than the threshold. In the case of (FL Sum>Threshold), 1 is added to a value of a counter. In the case of (FL Sum≦Threshold), 1 is subtracted from the counter value. This counter is provided in the communication characteristic acquisition section 23.

Figure 19:
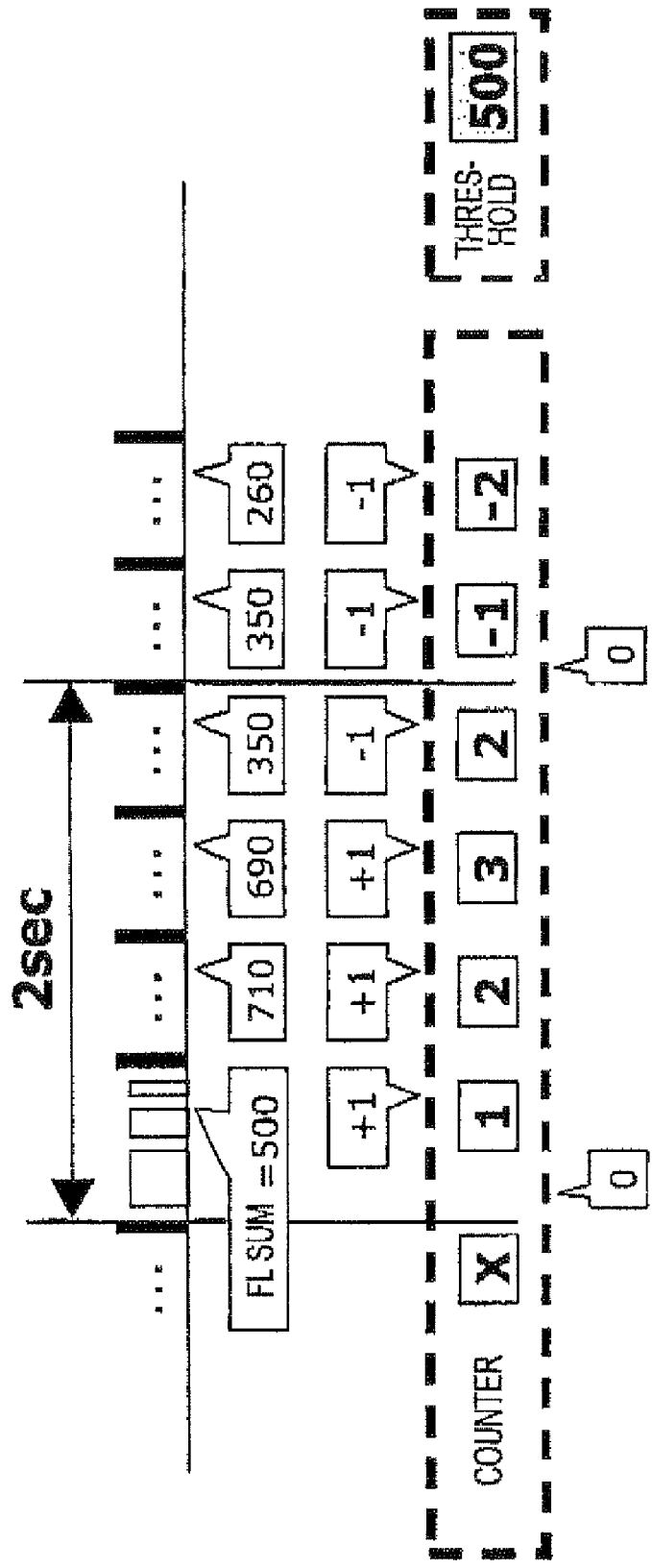
FIG. 19 is a diagram showing an example of a counter value of the communication section according to the second embodiment of the present invention.

Since a sum of detected FLs proceeds to 500, 710, 690, and 350 every time when a beacon signal is generated in the example shown in FIG. 19, the counter value is changed by "+1", "+1", "+1", and "−1" on a case-by-case basis.

The frame length control section 22 performs a control operation in a cycle of 2 sec. In every control operation, the frame length control section 22 checks the counter of the communication characteristic acquisition section 23 and resets the counter to 0. Then, it is determined whether or not to limit the frame length in response to the counter value. That is, a frame length limit for all PLC modems 100 connected to the power line 700 as the common transmission channel is forcedly prohibited when the counter value is positive as shown in FIG. 19. In this case, the present state is stored as "FL Control Prohibition". The present state is stored as "FL Control Allowance" when the counter value is negative. Here, the stored content is reflected in ON/OFF of the FL control function. In the state of "FL Control 2D Allowance", a training process is allowed in the state of "FL Control ON" in the training process for evaluating a TM of this embodiment to be described later.

By executing this process, the PLC modem is able to determine ON/OFF of the FL control function in consideration of the effect of traffic to another counterpart within its own PLC modem and another PLC modem for each counterpart PLC modem.

Processes such as the configuration of an error map (step S42), the detection of an FL control change point (step S44), and the reconfiguration of an error map (step S42) shown in FIG. 15 are executed regardless of a value or state of the counter of the communication characteristic acquisition section 23.

It is possible to mitigate a sudden increase/decrease of traffic by setting a counter for each beacon cycle in the above-described embodiment. On the other hand, a traffic amount may be more simply added for 2 sec in the same method and an evaluation may be performed in a unit of 2 sec regardless of a beacon cycle. At this time, for example, when the beacon cycle is set to 50 msec, a simple evaluation is possible by setting a threshold, converted into 2 sec of a ratio corresponding to "600" defined within the beacon cycle, to "24000" (=600×40).

Figure 20:
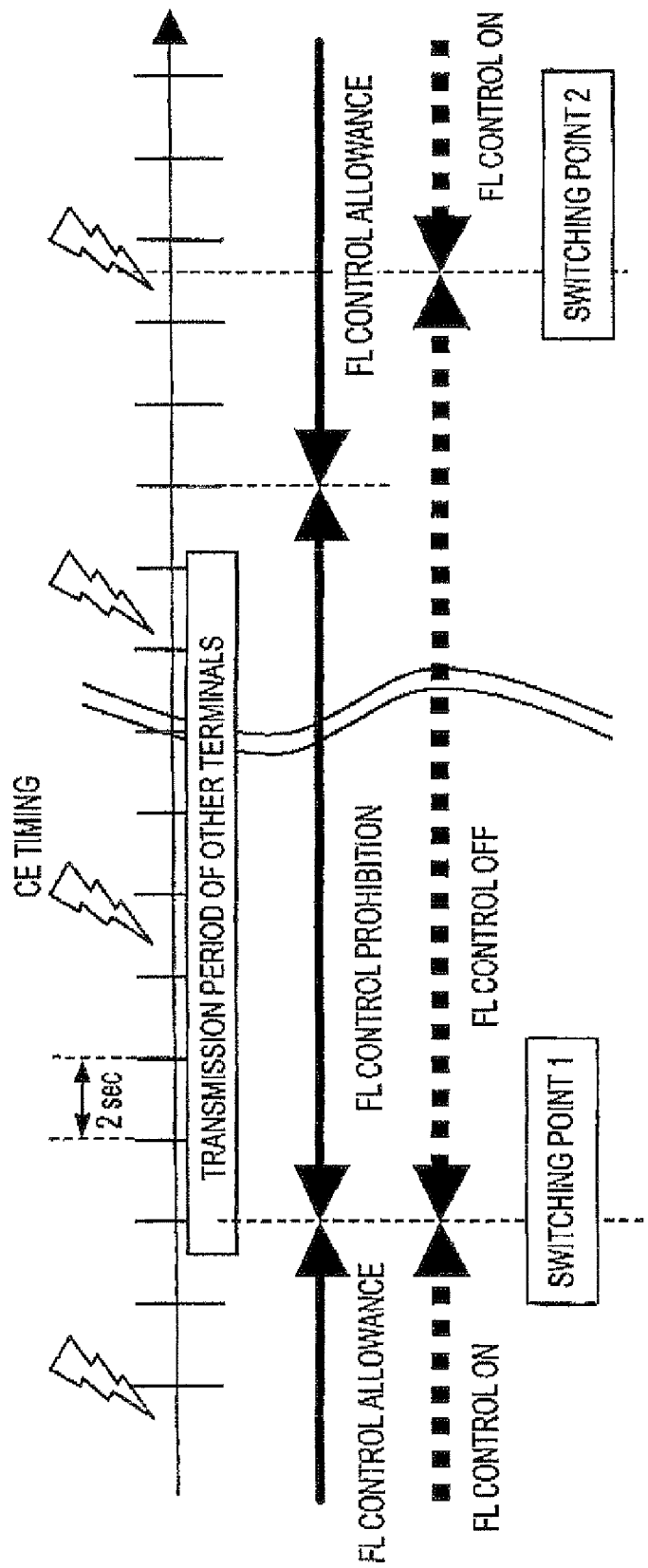
FIG. 20 is a timing chart showing the timing of FL control ON/OFF according to the second embodiment of the present invention.

Next, the determination of "FL Control Allowance" and "FL Control Prohibition" and the timing of ON/OFF of the FL control function will be described using FIG. 20.

The FL control function is to be switched from ON to OFF when the state is changed from the "FL Control Allowance" state to the "FL Control Prohibition" state by the incorporation of other traffic. At this time, a temporary switching operation is to be carried out since there is a possibility that performance may be degraded by the incorporation of other traffic. Accordingly, in the case of the above-described state change, the FL control function is switched from ON to OFF simultaneously with the detection (a switching point 1 of FIG. 20).

On the other hand, it is possible to switch the FL control function from OFF to ON when the state is changed from the "FL Control Prohibition" state to the "FL Control Allowance" state by preventing the incorporation of other traffic. In this case, a transmission band is widened even in the OFF state of the FL control function by preventing the incorporation of other traffic. Thus, it is not necessary to switch the FL control function from OFF to ON simultaneously with the state change (a switching point 2 of FIG. 20). The FL control function is turned on in the evaluation of the next CE request/CER when one of the ON and OFF of the FL control function is determined by evaluating which of the ON and OFF of the FL control function has high performance with one parameter of a TM determination based on a CE request/CER as described later.

The FL control function may be switched from OFF to ON simultaneously when the state is changed from the "FL Control Prohibition" state to the "FL Control Allowance" state.

A transmission channel evaluation process based on the CE request/CER may be executed, and the timing when the FL control function is switched from OFF to ON may be advanced, simultaneously when the state is changed from the "FL Control Prohibition" state to the "FL Control Allowance" state.

(Third Embodiment)

A functional block of the PLC modem 100 in the third embodiment of the present invention is not shown, but is a combination of the functional block of the PLC modem in the first embodiment and the functional block of the PLC modem in the second embodiment.

Next, the content of the main process of the PLC modem 100 of this embodiment will be described.

In the PLC modem 100 of this embodiment, the communication parameter setting section 11 performs various changes to improve communication characteristics as well as a difference of a first-order modulation scheme for each subcarrier frequency or an error correction mode. For example, whether or not to insert a pilot symbol into a communication frame (pilot symbol: ON/OFF) is switched to respond to a small transmission characteristic change. When the PLC modem 100 adopts pulse amplitude modulation (PAM), it is switched to how many bits are transmitted once (PAM: limit-free PAM, Max 8PAM, Max 4PAM, or Max). It is switched whether or not the FL control operation is performed (FL control: ON/OFF).

Figure 21:
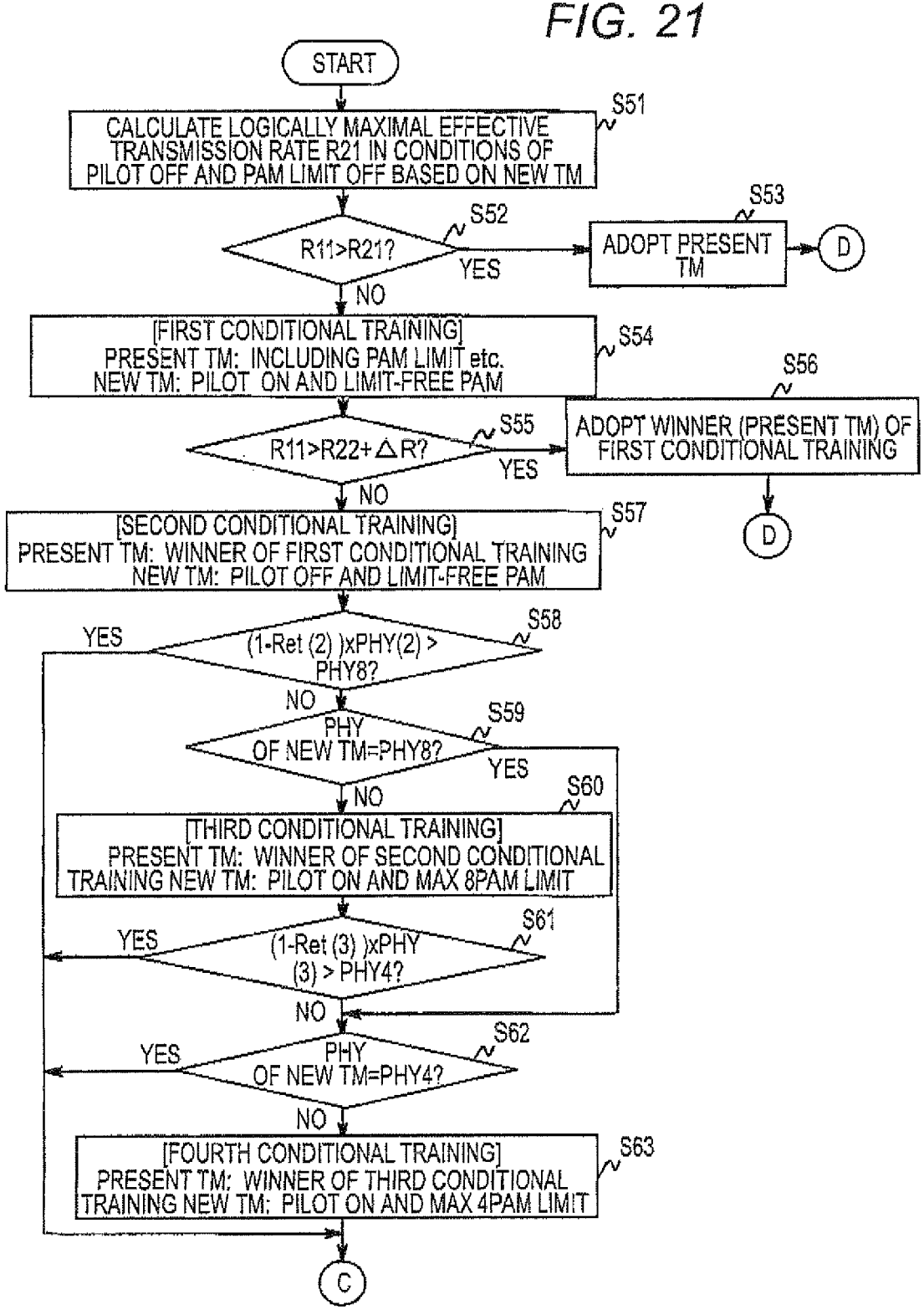
FIG. 21 is a flowchart showing an example of the entire training process according to a third embodiment of the present invention.
Figure 22:
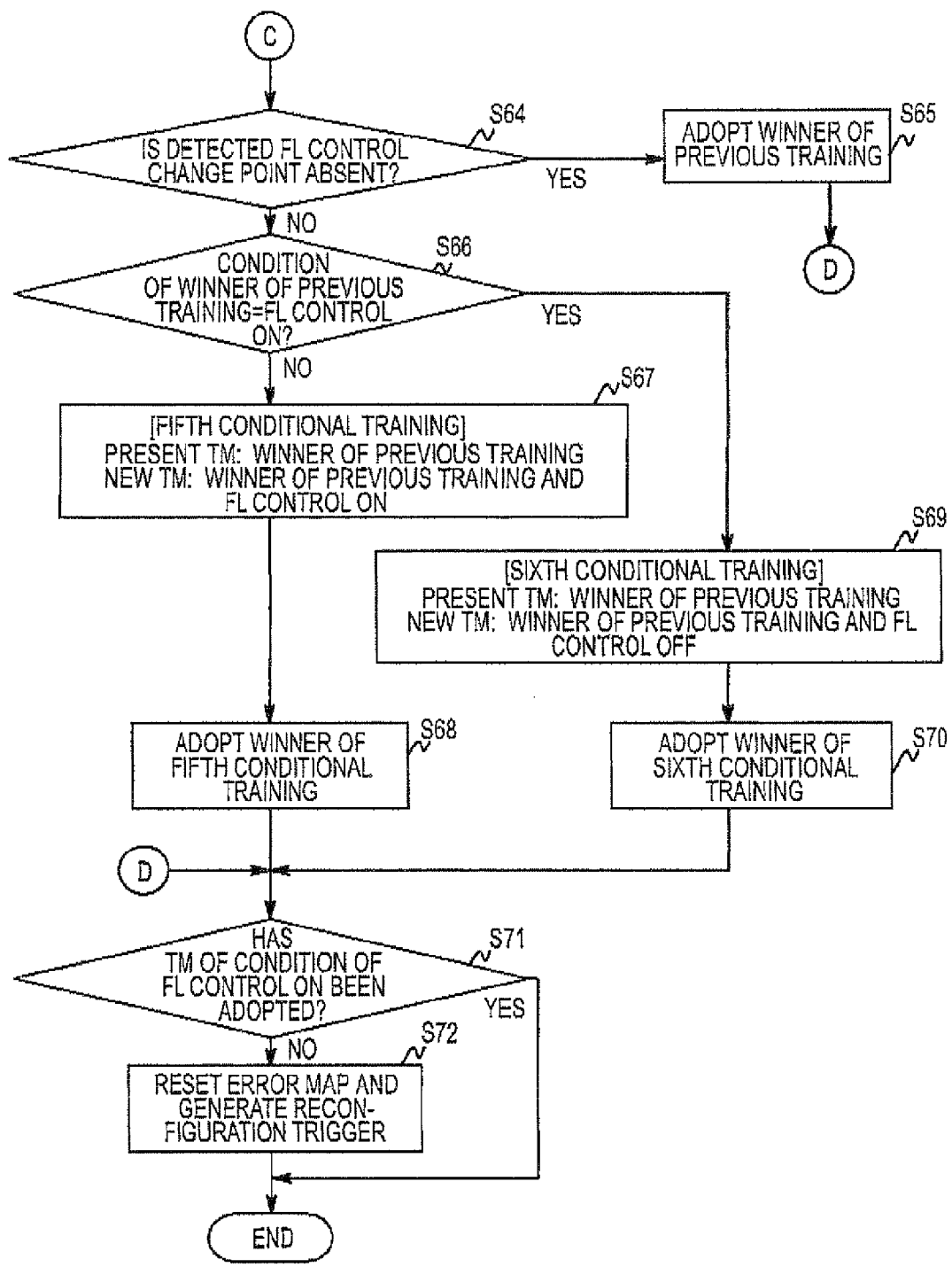
FIG. 22 is a flowchart showing an example of the entire training process according to the third embodiment of the present invention.

FIGS. 21 and 22 are a flowchart showing an example of the entire training process (the integrated process into which the process described in the first embodiment and the process described in the second embodiment are integrated) to be executed by the PLC modem 100. In the process shown in FIGS. 21 and 22, the process shown in FIGS. 6 and 7 is repeated a plurality of times while appropriately changing conditions. Whether to perform the FL control function is added.

In step S51, the comparison section 13 calculates a logically maximal effective transmission rate R21 (when the retransmission ratio is 0) on the basis of the content of the above-described new TM. In this regard, here, the calculation is performed by applying the conditions of pilot symbol OFF and PAM limit (limit of the number of modulation bits) OFF.

In step S52, the comparison section 13 compares the effective transmission rate R11 obtained in step S17 of FIG. 6 with the effective transmission rate R21 of step S51. When R11 is greater than R21, the process proceeds to step S53. Otherwise, the process proceeds to step S54. That is, the process proceeds to step S53 since a subsequent training process is unnecessary when communication performance is inferior to that of the present TM even at the highest effective transmission rate R21 in the case of assuming that the retransmission ratio is 0 in the best condition without a PAM limit for a new TM.

In step S53, the communication parameter setting section 11 adopts the present TM as a communication parameter to be used by the communication section 14.

"First conditional training" of step S54 corresponds to a process after step S20 among the processes shown in FIGS. 6 and 7. In this regard, in the first conditional training, a condition including a PAM limit for a present TM (a condition adopted at this time) is applied. For a new TM, a pilot symbol is turned on and a condition of a limit-free PAM is applied. That is, the training is started in a state in which the pilot symbol has been turned on and the effective transmission rate has been improved.

In step S55, the comparison section 13 identifies whether or not the same condition as that of step S22 of FIG. 6 is satisfied. That is, the process proceeds to step S56 when the new TM is degraded by the threshold ΔR or more as a result of comparing the effective transmission rate R22 produced from the retransmission ratio obtained by the first training process with the effective transmission rate R11. Otherwise, the process proceeds to step S57

In step S56, the communication parameter setting section 11 adopts the present TM, which is the winner of the first conditional training (step S54), as the communication parameter to be used by the communication section 14.

"Second conditional training" of step S57 corresponds to a process after step S20 among the processes shown in FIGS. 6 and 7. In this regard, in the second conditional training, the same condition as that of the winner of the first conditional training is applied for a present TM. For a new TM, a pilot symbol is turned off and the condition of the limit-free PAM is applied. That is, the same process as the first conditional training is repeated by switching the pilot symbol to OFF for the new TM.

In step S58, the comparison section 13 compares the effective transmission rate (1−Ret(2)×PHY(2)) for the TM of the winner of the second conditional training with the transmission rate (PHY8) at which the retransmission ratio has been neglected in the case of limiting the transmission rate to the maximum 8PAM (3 bits: 8 levels). (Ret(2)) denotes the retransmission ratio acquired by the "second conditional training", and (PHY(2) or (PHY8)) denotes the transmission rate of the physical layer level (that is, without considering the retransmission ratio). When the condition of step S58 is satisfied, the process proceeds to step S64. Otherwise, the process proceeds to step S59.

In step S59, the comparison section 13 compares the transmission rate (PHY) of the physical layer level in the case of the limit-free PAM for a new TM with the transmission rate (PHY8) at which the retransmission ratio has been neglected in the case of limiting the transmission rate to the maximum 8PAM. When the condition of step S59 is satisfied, the process proceeds to step S62. Otherwise, the process proceeds to step S60. For example, in the case of a TM in which the condition of 8PAM or less does not exist originally, the next step S60 is omitted since the transmission rate is not changed even when the PAM limit is made.

"Third Conditional Training" of step S60 corresponds to a process after step S20 among the processes shown in FIGS. 6 and 7. In this regard, in the third conditional training, the same condition as that of the winner of the second conditional training is applied for the present TM. For the new TM, a pilot symbol is turned on and the condition in which the maximum 8PAM limit is turned on is applied. That is, the same process as the second conditional training is repeated by switching the condition for the new TM.

In step S61, the comparison section 13 compares the effective transmission rate (1-Ret(3)×PHY(3)) for the TM of the winner of the third conditional training with the transmission rate (PHY4) at which the retransmission ratio has been neglected in the case of limiting the transmission rate to the maximum 4PAM (2 bits: 4 levels). (Ret(3)) denotes the retransmission ratio acquired by the "third conditional training", and (PHY(3) or (PHY4)) denotes the transmission rate of the physical layer level (that is, without considering the retransmission ratio). When the condition of step S61 is satisfied, the process proceeds to step S64. Otherwise, the process proceeds to step S62.

In step S62, the comparison section 13 compares the transmission rate (PHY) of the physical layer level in the case of the limit-free PAM for the new TM with the transmission rate (PHY4) in the case of limiting the transmission rate to the maximum 4PAM. When the condition of step S62 is satisfied, the process proceeds to step S64. Otherwise, the process proceeds to step S63. For example, in the case of a TM in which the condition of 4PAM or less does not exist originally, the next step S63 is omitted since the transmission rate is not changed even when the PAM limit is made.

"Fourth Conditional Training" of step S63 corresponds to a process after step S20 among the processes shown in FIGS. 6 and 7. In this regard, in the fourth conditional training, the same condition as that of the winner of the third conditional training is applied for the present TM. For the new TM, a pilot symbol is turned on and the condition in which the maximum 4PAM limit is turned on is applied. That is, the same process as the third conditional training is repeated by switching the condition for the new TM.

In step S64, the frame length control section 22 checks the presence/absence of the detection of the FL control change point. When the detection has not been made, the process proceeds to step S65. When the detection has been made, the process proceeds to step S66.

In step S65, the communication parameter setting section 11 adopts the TM and the condition of the winner in the training executed immediately before this process as communication parameters of the communication section 14.

In step S66, the frame length control section 22 identifies whether or not the condition of the winner in the training executed immediately before this process is "FL control ON". In the case of the FL control ON, the process proceeds to step S69. Otherwise, the process proceeds to step S67.

"Fifth Conditional Training" of step S67 corresponds to a process after step S20 among the processes shown in FIGS. 6 and 7. In this regard, in the fifth conditional training, the same condition as that of the winner of the previous training is applied for the present TM. On the other hand, for the new TM, the FL control function is turned on and other conditions which are the same as those of the winner of the previous training are applied. That is, the training is executed by switching only the condition regarding the "FL control ON".

In step S68, the communication parameter setting section 11 adopts the TM of the winner of the fifth conditional training and the condition applied thereto as communication parameters of the communication section 14.

"Sixth Conditional Training" of step S69 corresponds to a process after step S20 among the processes shown in FIGS. 6 and 7. In this regard, in the sixth conditional training, the same condition as that of the winner of the previous training is applied for the present TM. On the other hand, for the new TM, the FL control function is turned off and other conditions which are the same as those of the winner of the previous training are applied. That is, the training is executed by switching only the condition regarding the "FL control ON/OFF".

In step S70, the communication parameter setting section 11 adopts the TM of the winner of the sixth conditional training and the condition applied thereto as communication parameters of the communication section 14.

In step S71, the communication parameter setting section 11 identifies whether or not the condition of FL control ON is applied to communication parameters finally adopted as training results. When a TM of FL control OFF has been selected, the process proceeds to the next step S72.

In step S72, the frame length control section 22 resets an error map described in the second embodiment, and generates a trigger for reconfiguring the error map. Thus, it is possible to increase the accuracy of control in the case where FL control is performed by reconfiguring an error map even when impulse noise is generated at the time of detecting an FL control change point, some fluctuation or the like is generated at the detected FL control change point by the effect of noise, and the error map does not reflect an exact change point.

The FL control ON/OFF of the new TM has the same condition as that of the present TM in each of the first conditional training (step S54), the second conditional training (step S57), the third conditional training (step S60), and the fourth conditional training (step S63).

It is possible to adopt communication parameters of a more exact TM in consideration of pilot symbol ON/OFF information, PAM limit information, and FL control ON/OFF information by executing the process of FIGS. 21 and 22.

Next, the entire flow regarding an operation in which the PLC modem 100 selects a communication parameter of an appropriate TM will be described with reference to FIG. 23.

When the PLC modem 100 to which power is applied is started, the PLC modem 100 performs CE request transmission (see FIG. 6) and CER reception (see FIG. 6) thereto after carrying out predetermined initialization (ADJUST: corresponding to the fourth training described in the first embodiment), and generates a new TM on the basis of evaluation information included in the CER.

Thereafter, the PLC modem 100 performs training TR11 for evaluating a present TM and a new TM over a period of 400 to 1000 msec. The content of the training TR11 is slightly different from the content shown in FIGS. 6 and 7. For example, the retransmission ratio of the present TM and the retransmission ratio of the new TM are acquired over a predetermined period while alternately switching the present TM and the new TM since the training is started before results of data transmission corresponding to step S12 are obtained. A TM to be adopted is determined by comparing the results thereof.

Likewise, the PLC modem 100 is started to transmit a CE request after a passage of 1 sec, 3 sec, 7 sec, or the like, receive a CER to the request, and determine the TM to be adopted by the training TR12 or the like. As described above, the same is repeated a predetermined number of times (training TR12, TR13, TR14, . . . ). The content of the training TR12, TR13, or TR14 is the same as that of TR11. The number of repeats (4) is strictly illustrative. These are the flow of a first step.

General data transmission/reception is enabled in about 10 sec after the start of the PLC modem 100.

A length of training itself is not changed in TR11 to TR14, but a training period is gradually lengthened.

Following the first step, for example, the PLC modem 100 is started to carry out the training TR21 over 100 to 1000 msec after 13 sec. After the CE request/CER reception in the training TR21, the PLC modem 100 acquires the retransmission ratio of the present TM and the retransmission ratio of the new TM over a predetermined period with the first training process shown in FIG. 6, compares the results thereof, and determines the TM to be adopted.

Likewise, for example, the PLC modem 100 is started to carry out the CE request/CER reception after a passage of 21 sec and determine the TM to be adopted by the training TR21 or the like. As described above, the training is repeated a predetermined number of times (training TR22, . . . ). The content of the training TR22 is the same as that of TR21. The number of repeats (2) is strictly illustrative. These are the flow of a second step.

As in the first step, a length of training itself is not changed in TR21 and TR22, but a training period is gradually lengthened.

Following the second step, for example, the PLC modem 100 is started to carry out the training TR31 over 100 to 11500 msec after 13 sec. After the CE request/CER reception in the training TR31, the PLC modem 100 executes the first to fourth training processes shown in FIG. 6 and determines the TM to be adopted. In this case, a necessary communication characteristic (for example, a retransmission ratio) of the present TM is acquired in advance when the process of FIGS. 6 and 7 is executed. The acquisition period is immediately before the first to fourth training processes are executed (for example, 39 sec to 43 sec).

Likewise, for example, the PLC modem 100 is started to carry out the CE request/CER reception after a passage of 57 sec and determine the TM to be adopted by the training TR32 or the like. As described above, the training is repeated a predetermined number of times (training TR32, . . . ). The content of the training TR32 is the same as that of TR31. The number of repeats (2) is strictly illustrative. These are the flow of a third step.

As in the first and second steps, a length of training itself is not changed in TR31 and TR32, but a training period is gradually lengthened. In this regard, the training period is constant after the training period reaches about 30 sec.

The process of FIG. 23 enables an optimal TM to be smoothly and exactly adopted by correcting a TM while promptly and fully executing a simple training process of a short period and by executing a training process in which the certainty of a long period is emphasized according to a passage of time since characteristics of the power line 700 as the transmission channel are in an unstable state immediately after the PLC modem 100 is started.

The PLC modem 100 may perform an FL control ON/OFF determination which is asynchronous with that of FIG. 23.

Here, the first to third embodiments will be summarized as follows.

According to the embodiments of the present invention, there is provided a communication device for transmitting data to an other communication device via a transmission channel, including: a communication frame generation section which generates a communication frame storing the data; a communication characteristic acquisition section which acquires a communication characteristic of the transmission channel; and a frame length control section which controls a frame length of the communication frame based on the communication characteristic of the transmission channel.

According to the communication device, it is possible to maintain optimal communication characteristics and also prevent the efficiency of transmission from being degraded even when a transmission channel state is not constant. For example, it is possible to control a communication frame not to be transmitted only in a time period where there is a possibility that the communication characteristics may be degraded.

Preferably, in the communication device of the present invention, the transmission channel is a power line.

According to the communication device, it is possible to maintain optimal communication characteristics and also prevent the efficiency of transmission from being degraded even when the transmission channel is the power line and the state of the transmission channel is not constant.

Preferably, in the communication device of the present invention, the communication characteristic acquisition section acquires information corresponding to an impedance change of the power line as the communication characteristic.

According to the communication device, it is possible to prevent the efficiency of transmission from being degraded even when the impedance of the power line is not constant since the frame length may be controlled so that the impedance change does not have an influence by acquiring information corresponding to the impedance change as the communication characteristic.

Preferably, in the communication device of the present invention, the frame length control section estimates an impedance change point in the power line based on the information corresponding to the impedance change, and may control the frame length of the communication frame based on the impedance change point.

According to the communication device, it is possible to identify a point in time when the transmission channel characteristic has been changed by the impedance change, and it is possible to avoid the communication of a communication frame estimated to be at the impedance change point later by estimating the identified time point as the impedance change point.

Preferably, in the communication device of the present invention, the communication characteristic acquisition section acquires transmission error information regarding a transmission error of each predetermined time period in the communication frame when the communication frame has been transmitted as the information corresponding to the impedance change. The frame length control section may estimate the impedance change point based on the transmission error information.

According to the communication device, it is possible to determine whether the transmission error of a transmitted communication frame has been generated and control the frame length to avoid a transmission error generation point.

Preferably, in the communication device of the present invention, the communication characteristic acquisition section may accumulate the transmission error information at each predetermined time period. The frame length control section may extract a first time period in which the number of accumulated transmission error information elements is equal to or greater than a predetermined value and a second time period after the first time period, and may estimate the first time period as a first impedance change point in the power line and the second time period as a second impedance change point in the power line.

According to the communication device, it is possible to know the timing when the transmission error is frequently generated and it is possible to control the frame length to avoid the timing.

Preferably, in the communication device of the present invention, the frame length control section corrects a position of the estimated impedance change point based on a distance between the estimated first impedance change point and the estimated second impedance change point.

According to the communication device, the first time period and the second time period tend to be shifted back from an actual impedance change point of the power line. It is possible to control the frame length so that the communication frame is sure not to be transmitted at the impedance change point by correcting a position of the change point.

Preferably, in the communication device of the present invention, the communication characteristic acquisition section acquires data amount information on the transmission channel by detecting the communication frame to be transmitted on the transmission channel. The frame length control section determines whether or not to control the frame length of the communication frame on the basis of the data amount information.

According to the communication device, it is possible to prevent the efficiency of transmission from being degraded while maintaining optimal communication characteristics by prohibiting the control of the frame length when the data amount (that is, traffic) on the transmission channel is large and controlling the frame length when the data amount is small.

Also, there is provided a communication method for transmitting data to an other communication device via a transmission channel, including: generating a communication frame storing the data; acquiring a communication characteristic of the transmission channel; and controlling a frame length of the communication frame based on the communication characteristic of the transmission channel.

According to the communication method, it is possible to maintain optimal communication characteristics and also prevent the efficiency of transmission from being degraded even when the state of the transmission channel is not constant. For example, it is possible to control a communication frame not to be transmitted only in a time period where there is a possibility that the communication characteristics may be degraded.

Further, there is provided an integrated circuit use in a communication device for transmitting data to an other communication device via a transmission channel, including: a communication frame generation section which generates a communication frame storing the data; a communication characteristic acquisition section which acquires a communication characteristic of the transmission channel; and a frame length control section which controls a frame length of the communication frame based on the communication characteristic of the transmission channel.

According to the integrated circuit, it is possible to maintain optimal communication characteristics and also prevent the efficiency of transmission from being degraded even when the state of the transmission channel is not constant. For example, it is possible to control a communication frame not to be transmitted only in a time period where there is a possibility that the communication characteristics may be degraded.

Preferably, the communication device of the present invention further includes a communication performance acquisition section which acquires communication performance corresponding to the communication frame; and a determination section which determines whether the frame length of the communication frame is to be controlled on the basis of the communication performance.

According to the communication device, it is possible to maintain optimal communication characteristics and also prevent the efficiency of transmission from being degraded even when the state of the transmission channel is not constant. For example, there may be the case where it is difficult to capture transmission channel characteristics accurately according to a type or environment of the transmission channel. There is a problem in that the efficiency of transmission may be degraded when the frame length of the communication frame has been controlled on the basis of the inaccurately captured transmission channel characteristics. It is possible to suppress the degradation of transmission efficiency due to an unnecessary frame length control operation by determining whether the frame length of the communication frame is to be controlled on the basis of the communication performance of the communication frame.

Preferably, the communication device of the present invention further includes: a transmission section which transmits the communication frame to the other communication device; and a reception section which receives a response to the communication frame from the other communication device, wherein the response includes information regarding the communication performance.

According to the communication device, it is possible to suppress the degradation of transmission efficiency due to an unnecessary frame length control operation by acquiring information regarding communication performance from the response to the communication frame.

Preferably, in the communication device of the present invention, the information regarding the communication performance includes at least one of a retransmission ratio regarding the communication frame and a transmission rate regarding the communication frame.

According to the communication device, it is possible to suppress the degradation of transmission efficiency due to an unnecessary frame length control operation by acquiring at least one of a retransmission ratio regarding the communication frame and a transmission rate regarding the communication frame as information regarding the communication performance.

Preferably, in the communication device of the present invention, the transmission section transmits a first communication frame of which a frame length has been controlled and a second communication frame of which a frame length has not been controlled. The reception section may receive information regarding first communication performance corresponding to the first communication frame and information regarding second communication performance corresponding to the second communication frame. The determination section may determine whether or not the frame length of the communication frame is to be controlled on the basis of a comparison result of the first communication performance and the second communication performance.

According to the communication device, it is possible to determine whether the frame length of the communication frame is to be controlled by comparing the communication performance of the communication frame of which the frame length is controlled (the first communication performance) with the communication performance of the communication frame of which the frame length is not controlled (the second communication performance).

Preferably, the communication device of the present invention further includes: a pilot symbol insertion section which inserts a pilot symbol into the communication frame, wherein the determination section determines whether the pilot symbol is to be inserted on the basis of the communication performance.

According to the communication device, it is possible to maintain optimal communication characteristics and also prevent the efficiency of transmission from being degraded even when the state of the transmission channel is not constant. For example, there may be the case where it is difficult to capture transmission channel characteristics accurately according to a type or environment of the transmission channel. There is a problem in that the efficiency of transmission may be degraded when the pilot symbol has been inserted on the basis of the inaccurately captured transmission channel characteristics. It is possible to suppress the degradation of transmission efficiency due to the insertion of a redundant pilot symbol by determining whether or not the pilot symbol is to be inserted on the basis of the communication performance of the communication frame.

Preferably, the communication device of the present invention further includes: a modulation/demodulation section which modulates/demodulates the communication frame; and a decision section which decides a modulation/demodulation scheme on the basis of the communication performance.

According to the communication device, it is possible to suppress the degradation of transmission efficiency or retransmission due to an inappropriate modulation scheme selection operation since an appropriate modulation/demodulation scheme is able to be decided on the basis of the communication performance of the communication frame.

Preferably, the communication method of the present invention further includes: acquiring communication performance corresponding to the communication frame; and determining whether the frame length of the communication frame is to be controlled on the basis of the communication performance.

According to the communication method, it is possible to maintain optimal communication characteristics and also prevent the efficiency of transmission from being degraded even when the state of the transmission channel is not constant. For example, there may be the case where it is difficult to capture transmission channel characteristics accurately according to a type or environment of the transmission channel. There is a problem in that the efficiency of transmission may be degraded when the frame length of the communication frame has been controlled on the basis of the inaccurately captured transmission channel characteristics. It is possible to suppress the degradation of transmission efficiency due to an unnecessary frame length control operation by determining whether or not the frame length is to be controlled on the basis of the communication performance of the communication frame.

Preferably, the integrated circuit of the present invention further includes: a communication performance acquisition section which acquires communication performance corresponding to the communication frame; and a determination section which determines whether or not the frame length of the communication frame is to be controlled on the basis of the communication performance.

According to the integrated circuit, it is possible to maintain optimal communication characteristics and also prevent the efficiency of transmission from being degraded even when the state of the transmission channel is not constant. For example, there may be the case where it is difficult to capture transmission channel characteristics accurately according to a type or environment of the transmission channel. There is a problem in that the efficiency of transmission may be degraded when the frame length of the communication frame has been controlled on the basis of the inaccurately captured transmission channel characteristics. It is possible to suppress the degradation of transmission efficiency due to an unnecessary frame length control operation by determining whether or not the frame length is to be controlled on the basis of communication performance of the communication frame.

Although the invention has been illustrated and described for the particular preferred embodiments, it is apparent to a person skilled in the art that various charges and modifications can be made on the basis of the teachings of the invention. It is apparent that such changes and modifications are within the spirit, scope, and intention of the invention as defined by the appended claims.

The present application is based on Japanese Patent Application No. 2009-007906 filed on Jan. 16, 2009 and Japanese Patent Application No. 2009-007907 filed on Jan. 16, 2009, the contents of which are incorporated herein for reference.
Industrial Applicability The present invention can maintain optimal communication characteristics even when the state of the transmission channel is not constant, and is useful for a communication device or the like capable of preventing the efficiency of transmission from being degraded.

What is claimed is:

1. A communication device for transmitting data to an other communication device via a transmission channel, comprising:
    a communication frame generation section which generates a communication frame that stores the data;
    a communication characteristic acquisition section which acquires a communication characteristic of the transmission channel; and
    a frame length control section which controls a frame length of the communication frame storing the data based on the communication characteristic of the transmission channel,
    wherein the transmission channel is a power line and the communication characteristic acquisition section acquires information corresponding to an impedance change of the power line as the communication characteristic, and
    wherein the frame length control section estimates an impedance change point in the power line based on the information corresponding to the impedance change, and controls the frame length of the communication frame based on the impedance change point.

2. The communication device according to claim 1, wherein the communication characteristic acquisition section acquires information corresponding to an change of the communication characteristic of the transmission channel.

3. The communication device according to claim 1, wherein the transmission channel is a power line.

4. The communication device according to claim 1, wherein the communication frame generation section does not send the communication frame at a vicinity of an impedance change point in the power line.

5. The communication device according to claim 1, wherein the communication characteristic acquisition section acquires transmission error information regarding a transmission error of each predetermined time period in the communication frame when the communication frame has been transmitted as the information corresponding to the impedance change; and
    wherein the frame length control section estimates the impedance change point based on the transmission error information.

6. The communication device according to claim 5, wherein the communication characteristic acquisition section accumulates the transmission error information at each predetermined time period; and
    wherein the frame length control section extracts a first time period in which the number of accumulated transmission error information elements is equal to or greater than a predetermined value and a second time period after the first time period, and estimates the first time period as a first impedance change point in the power line and the second time period as a second impedance change point in the power line.

7. The communication device according to claim 6, wherein the frame length control section corrects a position of the estimated impedance change point based on a distance between the estimated first impedance change point and the estimated second impedance change point.

8. The communication device according to claim 1, further comprising:
    a communication performance acquisition section which acquires communication performance corresponding to the communication frame; and a determination section which determines whether the frame length of the communication frame is to be controlled on the basis of the communication performance.

9. The communication device according to claim 8, further comprising:

a transmission section which transmits the communication frame to the other communication device; and a reception section which receives a response to the communication frame from the other communication device, wherein the response includes information regarding the communication performance.

10. The communication device according to claim 9, wherein the information regarding the communication performance includes at least one of a retransmission rate regarding the communication frame and a transmission rate regarding the communication frame.

11. The communication device according to claim 9, wherein the transmission section transmits a first communication frame of which a frame length has been controlled and a second communication frame of which a frame length has not been controlled;

wherein the reception section receives information regarding first communication performance corresponding to the first communication frame and information regarding second communication performance corresponding to the second communication frame; and wherein the determination section determines whether the frame length of the communication frame is to be controlled on the basis of a comparison result of the first communication performance and the second communication performance.

12. The communication device according to claim 8, further comprising:

a pilot symbol insertion section which inserts a pilot symbol into the communication frame, wherein the determination section determines whether the pilot symbol is to be inserted on the basis of the communication performance.

13. The communication device according to claim 8, further comprising:

a modulation/demodulation section which modulates/demodulates the communication frame; and a decision section which decides a modulation/demodulation scheme on the basis of the communication performance.

14. A communication method for transmitting data to an other communication device via a transmission channel, comprising:

generating a communication frame that stores the data;

acquiring a communication characteristic of the transmission channel;

controlling a frame length of the communication frame based on the communication characteristic of the transmission channel, wherein the transmission channel is a power line and information corresponding to an impedance change of the power line is acquired as the communication characteristic;

estimating an impedance change point in the power line based on the information corresponding to the impedance change; and controlling the frame length of the communication frame based on the impedance change point.

15. The communication method according to claim 14, further comprising:

acquiring communication performance corresponding to the communication frame; and determining whether the frame length of the communication frame is to be controlled on the basis of the communication performance.

16. An integrated circuit use in a communication device for transmitting data to an other communication device via a transmission channel, comprising:

a communication frame generation section which generates a communication frame that stores the data;

a communication characteristic acquisition section which acquires a communication characteristic of the transmission channel; and a frame length control section which controls a frame length of the communication frame based on the communication characteristic of the transmission channel, wherein the transmission channel is a power line and the communication characteristic acquisition section acquires information corresponding to an impedance change of the power line as the communication characteristic, and wherein the frame length control section estimates an impedance change point in the power line based on the information corresponding to the impedance change, and controls the frame length of the communication frame based on the impedance change point.

17. The integrated circuit according to claim 16, further comprising:

a communication performance acquisition section which acquires communication performance corresponding to the communication frame; and a determination section which determines whether the frame length of the communication frame is to be controlled on the basis of the communication performance.

* * * * *